US012265359B2

(12) United States Patent
Henein et al.

(10) Patent No.: US 12,265,359 B2
(45) Date of Patent: Apr. 1, 2025

(54) GENERAL 2 DEGREE OF FREEDOM ISOTROPIC HARMONIC OSCILLATOR AND ASSOCIATED TIME BASE WITHOUT ESCAPEMENT OR WITH SIMPLIFIED ESCAPEMENT

(71) Applicant: ECOLE POLYTECHNIQUE FEDERALE DE LAUSANNE (EPFL), Lausanne (CH)

(72) Inventors: Simon Henein, Neuchâtel (CH); Lennart Rubbert, Bischheim (FR); Ilan Vardi, Neuchâtel (CH)

(73) Assignee: ECOLE POLYTECHNIQUE FEDERALE DE LAUSANNE (EPFL), Lausanne (CH)

(*) Notice: Subject to any disclaimer, the term of this patent is extended or adjusted under 35 U.S.C. 154(b) by 961 days.

(21) Appl. No.: 16/269,578

(22) Filed: Feb. 7, 2019

(65) Prior Publication Data

US 2019/0227493 A1 Jul. 25, 2019

Related U.S. Application Data

(62) Division of application No. 15/109,829, filed on Jul. 6, 2016, now Pat. No. 10,585,398.

(51) Int. Cl.

*G04B 17/04* (2006.01)
*G04B 15/14* (2006.01)
*G04B 21/08* (2006.01)
*G04B 23/00* (2006.01)

(52) U.S. Cl.

CPC ............ *G04B 17/04* (2013.01); *G04B 15/14* (2013.01); *G04B 17/045* (2013.01); *G04B 21/08* (2013.01); *G04B 23/005* (2013.01)

(58) Field of Classification Search

CPC ...... G04B 17/02; G04B 17/025; G04B 17/04; G04B 17/045; G04B 17/10; G04B 15/14; G04B 21/08; G04B 23/005; G04B 15/00

See application file for complete search history.

(56) References Cited

U.S. PATENT DOCUMENTS

| | | | | |
|---|---|---|---|---|
| 965,505 | A * | 7/1910 | Ecaubert | |
| 1,595,169 | A * | 8/1926 | Schieferstein ............ | F03G 7/08 74/25 |
| 1,919,796 | A | 7/1933 | Marrison | |
| 3,069,572 | A | 12/1962 | Dick | |
| 3,269,106 | A | 8/1966 | Ceh | |
| 3,318,087 | A | 5/1967 | Favre | |

(Continued)

FOREIGN PATENT DOCUMENTS

| | | |
|---|---|---|
| CH | 113025 A | 12/1925 |
| CH | 481411 A4 | 6/1969 |

(Continued)

OTHER PUBLICATIONS

Bertrand, J. (1873). Theoreme relatif au mouvement d'un point attiré vers un centre fixe. CR Acad. Sci, 77(849-853), 2.

(Continued)

*Primary Examiner* — Edwin A. Leon
(74) *Attorney, Agent, or Firm* — Nixon & Vanderhye P.C.

(57) ABSTRACT

A mechanical isotropic harmonic oscillator including a frame, a mass configured to oscillate, and three flexure rods, each flexure rod connecting the mass to the frame.

20 Claims, 34 Drawing Sheets

(56) References Cited

U.S. PATENT DOCUMENTS

| | | | | |
|---|---|---|---|---|
| 3,469,462 | A | 9/1969 | Steinemann et al. | |
| 3,528,308 | A * | 9/1970 | Favre | G04B 17/04 |
| | | | | 968/107 |
| 3,540,208 | A | 11/1970 | Kock | |
| 3,546,925 | A | 12/1970 | Barton | |
| 3,635,013 | A | 1/1972 | Bertsch | |
| 4,127,986 | A | 12/1978 | Nozawa | |
| 5,323,083 | A * | 6/1994 | Smythe | H03H 9/1035 |
| | | | | 310/353 |
| 5,359,893 | A * | 11/1994 | Dunn | G01C 19/5719 |
| | | | | 73/504.12 |
| 5,447,601 | A * | 9/1995 | Norris | G01C 19/5684 |
| | | | | 216/75 |
| 5,872,417 | A * | 2/1999 | Sugaya | H02N 2/108 |
| | | | | 310/317 |
| 7,040,162 | B2 * | 5/2006 | Lehureau | G01C 19/5642 |
| | | | | 73/504.12 |
| 7,192,180 | B2 | 3/2007 | Hayek et al. | |
| 7,522,478 | B2 | 4/2009 | Moteki | |
| 7,963,693 | B2 | 6/2011 | Genequand | |
| 8,110,967 | B2 * | 2/2012 | Ting | H02N 2/108 |
| | | | | 310/323.01 |
| 8,555,717 | B2 * | 10/2013 | Fell | G01C 19/5684 |
| | | | | 73/504.12 |
| 9,151,611 | B2 * | 10/2015 | Coronato | G01C 19/5642 |
| 9,477,205 | B2 * | 10/2016 | Born | G04C 3/101 |
| 2002/0191493 | A1 | 9/2002 | Hara | |
| 2003/0196490 | A1 * | 10/2003 | Cardarelli | G01P 15/14 |
| | | | | 73/504.02 |
| 2005/0007888 | A1 | 1/2005 | Jolidon | |
| 2007/0240509 | A1 | 10/2007 | Uchiyama | |
| 2008/0008052 | A1 | 1/2008 | Moteki | |
| 2010/0058861 | A1 * | 3/2010 | Kuang | G01P 15/09 |
| | | | | 73/504.12 |
| 2010/0207488 | A1 * | 8/2010 | Ting | H02N 2/108 |
| | | | | 310/323.06 |
| 2013/0279302 | A1 | 10/2013 | Vardi | |
| 2014/0290019 | A1 * | 10/2014 | Nakamura | H03H 3/0076 |
| | | | | 29/25.35 |
| 2016/0179058 | A1 | 6/2016 | Born | |
| 2016/0223989 | A1 * | 8/2016 | Winkler | G04B 17/28 |
| 2016/0327908 | A1 * | 11/2016 | Winkler | G04B 15/08 |
| 2016/0327910 | A1 | 11/2016 | Henein | |
| 2016/0344368 | A1 | 11/2016 | Ayazi | |
| 2019/0120287 | A1 * | 4/2019 | Cosandier | B64G 1/222 |

FOREIGN PATENT DOCUMENTS

| | | | |
|---|---|---|---|
| CH | 911067 | A4 | 6/1969 |
| CH | 512757 | A | 5/1971 |
| CN | 101105684 | A | 1/2008 |
| DE | 2354226 | A1 | 5/1975 |
| FR | 73414 | | 12/1866 |
| FR | 1457957 | A | 11/1966 |
| GB | 190921843 | A * | 9/1909 |
| GB | 240505 | | 9/1925 |
| JP | 2005-181318 | | 7/2005 |
| JP | 2005-526958 | | 9/2005 |
| JP | 2008-020211 | | 1/2008 |

OTHER PUBLICATIONS

Born, J. J., Dinger, R., & Farine, P. A. (1997). SALTO: un mouvement mécanique à remontage automatique ayant la précision d'un mouvement à quartz.

Defossez, L. (1950). Théorie générale de l'horlogerie, Tome Premier. Chambre suisse de l'horlogerie.

Rupert T. Gould, (2013) The Marine Chronometer, Second Edition, The Antique Collector's Club, Woodbrige, England (sent in 2 parts).

European Search Opinion of May 27, 2015 of EPO Application No. 14173947.4.

Extended European Search Report of May 27, 2015 of EPO Application No. 14173947.4.

First Office Action from the Russian Federal Institute of Industrial Property of Jun. 25, 2018 with the App. No. 2016130168/28 (046989) and English Translation.

First Office Action from the Russian Federal Institute of Industrial Property of Jun. 28, 2018 with the App. No. 2016130167/28 (046988) and English Translation.

First Office Action from the USPTO in a related case with the U.S. Appl. No. 15/109,829 of Feb. 16, 2018.

First Office Action from the USPTO of Jun. 26, 2018 for U.S. Appl. No. 15/109,821.

First Office Action of a related Chinese Patent Application with the Serial No. 201580013818.X, dated May 30, 2018 and English Translation.

First Office Action of Dec. 4, 2018 from the Japanese Patent Office for the Japanese Patent Application JP2016-563280 and English translation.

Henein, S. and Vardi, I., "Une horlogerie mécanique sans tic-tac," Pour la Science, Apr. 2017, No. 474, pp. 48-54.

International Search Report of PCT/IB2015/050242 of Nov. 25, 2015.

International Search Report of PCT/IB2015/050243 of Oct. 21, 2015.

Larry L. Howell, Compliant Mechanisms, John Wiley Sons, Inc., 2001, ISBN 0-471-38478-X, Abstract.

Li, Y. eet al. "A compliant parallel XY micromotion stage with complete kinematic decoupling." IEEE Transactions on Automation Science and Engineering, 9(3), pp. 538-553, 2012.

Li, Y. et al., "Design of a new decoupled XY flexure parallel kinematic manipulator with actuator isolation." Intelligent Robots and Systems, 2008, IEEE/RSJ International Conference on, pp. 470-475.

Nakayama, K., "A new method of determining the primary position of the eye using Listing's law." Am J Optom Physiol Opt, 55, pp. 331-336, 1978.

Partial European Search Report of Oct. 31, 2014 of EPO Application 14173947.4.

Rubbert, L., Bitterli, R., Ferrier, N., Fifanski, S., Vardi, I. and Henein, S. "Isotropic springs based on parallel flexure stages." Precision Engineering, 43, pp. 132-145, 2016.

Second Office Action from the USPTO in a related case with the U.S. Appl. No. 15/109,829 of Sep. 6, 2018.

Second Office Action from the USPTO of Jan. 23, 2019 for U.S. Appl. No. 15/109,821.

Simon Henein, "L'oscillateur IsoSpring," Dec. 2016.

Vardi, I., Rubbert, L., Bitterli, R., Ferrier, N., Kahrobaiyan, M., Nussbaumer, B. and Henein, S. "Theory and design of spherical oscillator mechanisms," Precision Engineering, 51, pp. 499-513, 2018.

Written Opinion of the International Search Authority of Nov. 25, 2015 for PCT/IB2015/050242.

Written Opinion of the International Search Authority of Oct. 21, 2015 for PCT/IB2015/050243.

Antoine Breguet, Régulateur isochrone de M. Yvon Villarceau, La Nature 1876 (premier semestre), pp. 187-190.

Chrystiaan Huygens, "The Pendulum Clock or Geometrical Demonstrations Concerning the Motionof Pendula As Applied to Clocks," Rerpint by The Iowa State Press in 1986, translated by Richard Blackwell, 1673.

Hall, R.W. and Josic, K., "Planetary motion and the duality of force laws," SIAM review, 42(1), pp. 115-124, 2000.

Henein, S. et al., "IsoSpring: vers la montre sans échappement." In Journée d'étude de la Société Suisse de Chronométrie (No. EPFL-TALK-201790), 2014.

Maxwell, J.C., "On governors," Proceedings of the Royal Society of London, 16, pp. 270-283, 1868.

Jules Haag, "Les mouvements vibratoires," Tome second, Presses Universitaires de France, 1955.

Jules Haag, "Sur le pendule conique," Comptes Rendus de l'Académie des Sciences, 1947, pp. 1234-1236.

(56) References Cited

OTHER PUBLICATIONS

Awtar, S., 2003. Synthesis and analysis of parallel kinematic XY flexure mechanisms (Doctoral dissertation, Massachusetts Institute of Technology).
Yvon Villarceau, "Sur les regulateurs isochrones, derives du systeme de Watt," Comptes Rendus de l'Academie des Sciences, 1872, pp. 1437-1445.

* cited by examiner

Isotropic spring with three flexible rods of circular section

Dumbbell on flexible membrane

GENERAL 2 DEGREE OF FREEDOM ISOTROPIC HARMONIC OSCILLATOR AND ASSOCIATED TIME BASE WITHOUT ESCAPEMENT OR WITH SIMPLIFIED ESCAPEMENT

CROSS REFERENCE TO RELATED APPLICATIONS

The present application is a divisional application of application Ser. No. 15/109,829 having a filing date of Jul. 6, 2016, which in turn is a United States national stage application of International Patent Application No. PCT/M2015/050243 that designated the United States, having an International filing date of Jan. 13, 2015, and claims foreign priority to European applications No EP 14150939.8 filed on Jan. 13, 2014, EP 14173947.4 filed on Jun. 25, 2014, EP 14183385.5 filed on Sep. 3, 2014, EP 14183624.7 filed on Sep. 4, 2014, and EP 14195719.1 filed on Dec. 1, 2014, the contents of all these earlier filed applications being incorporated in their entirety by reference.

BACKGROUND OF THE INVENTION

1 Context

The biggest improvement in timekeeper accuracy was due to the introduction of the oscillator as a time base, first the pendulum by Christiaan Huygens in 1656, then the balance wheel—spiral spring by Huygens and Hooke in about 1675, and the tuning fork by N. Niaudet and L.C. Breguet in 1866, see references [20] [5]. Since that time, these have been the only mechanical oscillators used in mechanical clocks and in all watches. (Balance wheels with electromagnetic restoring force approximating a spiral spring are included in the category balance wheel-spiral spring.) In mechanical clocks and watches, these oscillators require an escapement and this mechanism poses numerous problems due to its inherent complexity and its relatively low efficiency which barely reaches 40% at the very best. Escapements have an inherent inefficiency since they are based on intermittent motion in which the whole movement must be stopped and restarted, leading to wasteful acceleration from rest and noise due to impacts. Escapements are well known to be the most complicated and delicate part of the watch, and there has never been a completely satisfying escapement for a wristwatch, as opposed to the detent escapement for the marine chronometer.

PRIOR ART

Swiss patent No 113025 published on Dec. 16, 1925 discloses a process to drive an oscillating mechanism. A mentioned aim of this document is to replace an intermittent regulation by a continuous regulation but it fails to clearly disclose how the principles exposed apply to a timekeeper such as a watch. In particular, the constructions are not described as isotropic harmonic oscillators and only the simplest versions of the oscillator are described, FIGS. 20 and 22 below, but the superior performance of the spherical oscillator and compensated oscillator embodiments of FIGS. 21, 23 to 33, 39 to 41 are not presented.

Swiss patent application No 9110/67 published on Jun. 27, 1967 discloses a rotational resonator for a timekeeper. The disclosed resonator comprises two masses mounted in a cantilevered manner on a central support, each mass oscillating circularly around an axis of symmetry. Each mass is attached to the central support via four springs. The springs of each mass are connected to each other to obtain a dynamic coupling of the masses. To maintain the rotational oscillation of the masses, an electromagnetic device is used that acts on ears of each mass, the ears containing a permanent magnet. One of the springs comprises a pawl for cooperation with a ratchet wheel in order to transform the oscillating motion of the masses into a unidirectional rotational movement. The disclosed system therefore is still based on the transformation of an oscillation, that is an intermittent movement, into a rotation via the pawl which renders the system of this publication equivalent to the escapement system known in the art and cited above.

Swiss additional patent No 512757 published on May 14, 1971 is related to a mechanical rotating resonator for a timekeeper. This patent is mainly directed to the description of springs used in such a resonator as disclosed in CH patent application No 9110/67 discussed above. Here again, the principle of the resonator thus uses a mass oscillating around an axis.

U.S. Pat. No. 3,318,087 published on May 9, 1967 discloses a torsion oscillator that oscillates around a vertical axis. Again, this is similar to the escapement of the prior art and described above.

SUMMARY

An aim of the present invention is thus to improve the known systems and methods.

A further aim of the present invention is to provide a system that avoids the intermittent motion of the escapements known in the art.

A further aim of the present invention is to propose a mechanical isotropic harmonic oscillator.

Another aim of the present invention is to provide an oscillator that may be used in different time-related applications, such as: time base for a chronograph, timekeeper (such as a watch), accelerometer, speed governor.

The present invention solves the problem of the escapement by eliminating it completely or, alternatively, by a family of new simplified escapements which do not have the drawbacks of current watch escapements.

The result is a much simplified mechanism with increased efficiency.

In one embodiment, the invention concerns a mechanical isotropic harmonic oscillator comprising a two degree of freedom orbiting mass with respect to a fixed base with springs having isotropic and linear restoring force properties due to the intrinsic isotropy of matter.

In one embodiment, the isotropic harmonic oscillator may comprise a number of isotropic linear springs arranged to yield a two degree of freedom orbiting mass with respect to a fixed base.

In one embodiment, the isotropic harmonic oscillator may comprise a spherical mass with a number of equatorial springs.

In another embodiment, the isotropic harmonic oscillator may comprise a spherical mass with a polar spring.

In one embodiment, the mechanism may comprise two isotropic harmonic oscillators coupled by a shaft so as to balance linear accelerations.

In one embodiment, the mechanism may comprise two isotropic harmonic oscillators coupled by a shaft so as to balance angular accelerations.

In one embodiment, the mechanism may comprise a variable radius crank which rotates about a fixed frame through a pivot and a prismatic joint which allows the crank extremity to rotate with a variable radius.

In one embodiment, the mechanism may comprise a fixed frame holding a crankshaft on which a maintaining torque M is applied, a crank which is attached to a crankshaft and equipped with a prismatic slot, wherein a rigid pin is fixed to the orbiting mass of the oscillator or oscillator system, wherein said pin engages in said slot.

In one embodiment, the mechanism may comprise a detent escapement a for intermittent mechanical energy supply to the oscillator.

In one embodiment, the detent escapement comprises two parallel catches which are fixed to the orbiting mass, whereby one catch displaces a detent which pivots on a spring to releases an escape wheel, and whereby said escape wheel impulses on the other catch thereby restoring lost energy to the oscillator or oscillator system.

In one embodiment, the invention concerns a timekeeper such as a clock comprising an oscillator or an oscillator system as defined in the present application.

In one embodiment, the timekeeper is a wristwatch.

In one embodiment, the oscillator or oscillator system defined in the present application is used as a time base for a chronograph measuring fractions of seconds requiring only an extended speed multiplicative gear train, for example to obtain 100 Hz frequency so as to measure $1/100^{th}$ of a second.

In one embodiment, the oscillator or oscillator system defined in the present application is used as speed regulator for striking or musical clocks and watches, as well as music boxes, thus eliminating unwanted noise and decreasing energy consumption, and also improving musical or striking rhythm stability.

These embodiments and others will be described in more detail in the following description of the invention.

DETAILED DESCRIPTION OF THE SEVERAL VIEWS OF THE DRAWINGS

The present invention will be better understood from the following description and from the drawings which show FIG. 1 illustrates an orbit with the inverse square law;

DETAILED DESCRIPTION OF THE SEVERAL EMBODIMENTS

2 Conceptual Basis of the Invention 2.1 Newton's Isochronous Solar System

As is well-known, in 1687 Isaac Newton published *Principia Mathematica* in which he proved Kepler's laws of planetary motion, in particular, the First Law which states that planets move in ellipses with the Sun at one focus and the Third Law which states that the square of the orbital period of a planet is proportional to the cube of the semi-major axis of its orbit, see reference [19].

Figure 1:
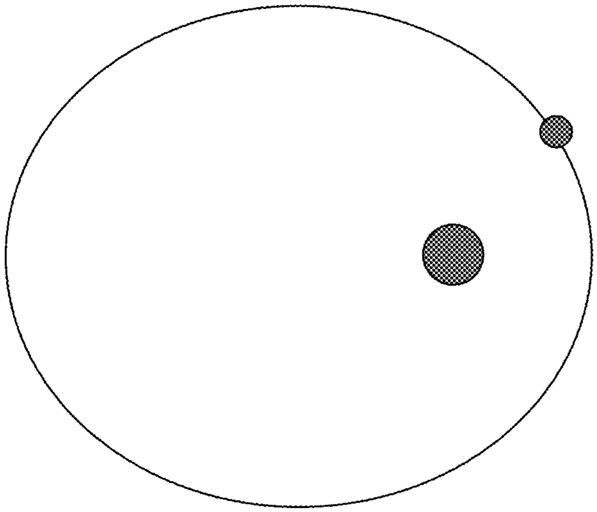
FIG.1 PRIOR ART
Figure 2:
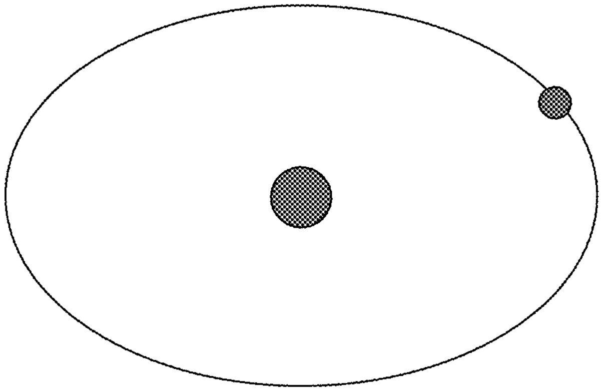
FIG.2 PRIOR ART
FIG. 2 illustrates an orbit according to Hooke's law.
Figure 3:
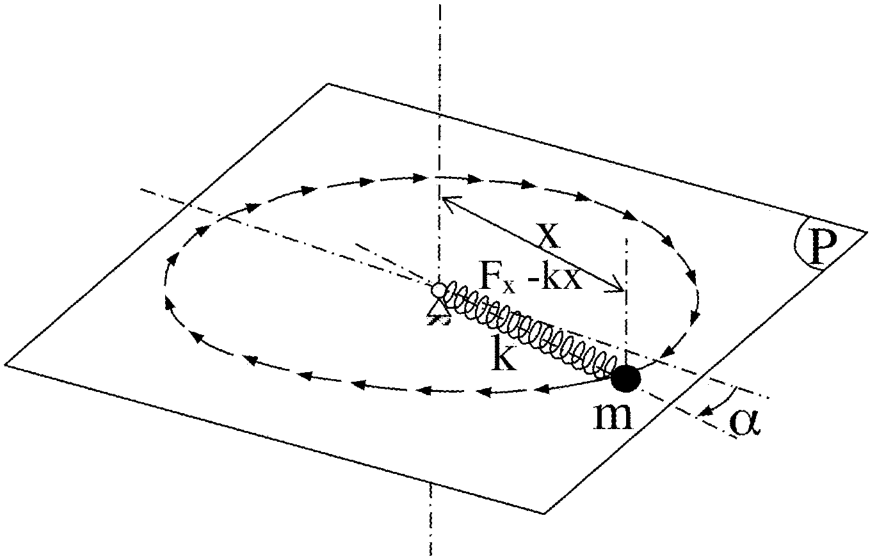
FIG.3 PRIOR ART
FIG. 3 illustrates an example of a physical realization of Hooke's law.

Less well-known is that in Book I, Proposition X, of the same work, he showed that if the inverse square law of attraction (see FIG. 1) was replaced by a linear attractive central force (since called Hooke's Law, see FIGS. 2 and 3) then the planetary motion was replaced by elliptic orbits with the Sun at the center of the ellipse and the orbital period is the same for all elliptical orbits. (The occurrence of ellipses in both laws is now understood to be due to a relatively simple mathematically equivalence, see reference [13], and it is also well-known that these two cases are the only central force laws leading to closed orbits, see reference [1].)

Newton's result for Hooke's Law is very easily verified: Consider a point mass moving in two dimensions subject to a central force $$F(r)=-kr$$

centered at the origin, where r is the position of the mass, then for an object of mass m, this has solution $$(A_1 \sin(\omega_0 t+\phi_1), A_2 \sin(\omega_0 t+\phi_2)),$$

for constants $A_1$, $A_2$, $\phi_1$, $\phi_2$ depending on initial conditions and frequency $$\omega_0 = \sqrt{\frac{k}{m}}.$$

This not only shows that orbits are elliptical, but that the period of motion depends only on the mass m and the rigidity k of the central force. This model therefore displays isochronism since the period $$T = 2\pi\sqrt{\frac{m}{k}}$$

is independent of the position and momentum of the point mass (the analogue of Kepler's Third Law proved by Newton).

2.2 Implementation as a Time Base for a Timekeeper

Isochronism means that this oscillator is a good candidate to be a time base for a timekeeper as a possible embodiment of the present invention.

This has not been previously done or mentioned in the literature and the utilization of this oscillator as a time base is an embodiment of the present invention.

This oscillator is also known as a harmonic isotropic oscillator where the term isotropic means "same in all directions."

Despite being known since 1687 and its theoretical simplicity, it would seem that the isotropic harmonic oscillator has never been previously used as a time base for a watch or clock, and this requires explanation. In the following, we will use the term "isotropic oscillator" to mean "isotropic harmonic oscillator."

It would seem that the main reason is the fixation on constant speed mechanisms such as governors or speed regulators, and a limited view of the conical pendulum as a constant speed mechanism.

For example, in his description of the conical pendulum which has the potential to approximate isochronism, Leopold Defossez states its application to measuring very small intervals of time, much smaller than its period, see reference [8, p. 534].

H. Bouasse devotes a chapter of his book to the conical pendulum including its approximate isochronism, see reference [3, Chapitre VIII]. He devotes a section of this chapter on the utilization of the conical pendulum to measure fractions of seconds (he assumes a period of 2 seconds), stating that this method appears perfect. He then qualifies this by noting the difference between average precision and instantaneous precision and admits that the conical pendulum's rotation may not be constant over small intervals due to difficulties in adjusting the mechanism. Therefore, he considers variations within a period as defects of the conical pendulum which implies that he considers that it should, under perfect conditions, operate at constant speed.

Similarly, in his discussion of continuous versus intermittent motion, Rupert Gould overlooks the isotropic harmonic oscillator and his only reference to a continuous motion timekeeper is the Villarceau regulator which he states: "seems to have given good results. But it is not probable that was more accurate than an ordinary good-quality driving clock or chronograph," see reference [9, 20-21]. Gould's conclusion is validated by the Villarceau regulator data given by Breguet, see reference [4].

From the theoretical standpoint, there is the very influential paper of James Clerk Maxwell On Governors, which is considered one of the inspirations for modern control theory, see reference [18].

Moreover, isochronism requires a true oscillator which must preserve all speed variations. The reason is that the wave equation $$\nabla^2 \vec{X} = \frac{1}{c^2}\frac{\partial^2 \vec{X}}{\partial t^2}$$

preserves all initial conditions by propagating them. Thus, a true oscillator must keep a record of all its speed perturbation. For this reason, the invention described here allows maximum amplitude variation to the oscillator.

This is exactly the opposite of a governor which must attenuate these perturbations. In principle, one could obtain isotropic oscillators by eliminating the damping mechanisms leading to speed regulation.

The conclusion is that the isotropic oscillator has not been used as a time base because there seems to have been a conceptual block assimilating isotropic oscillators with governors, overlooking the simple remark that accurate timekeeping only requires a constant time over a single complete period and not over all smaller intervals.

We maintain that this oscillator is completely different in theory and function from the conical pendulum and governors, see hereunder in the present description.

Figure 4:
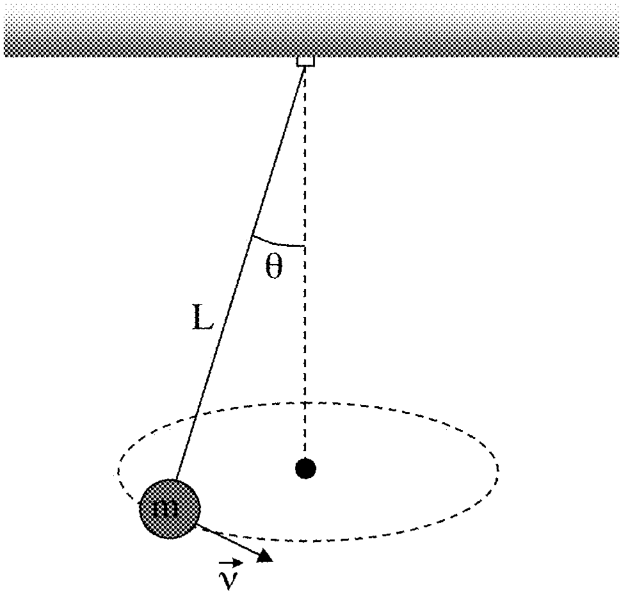
FIG.4 PRIOR ART
FIG. 4 illustrates the conical pendulum principle.
Figure 5:
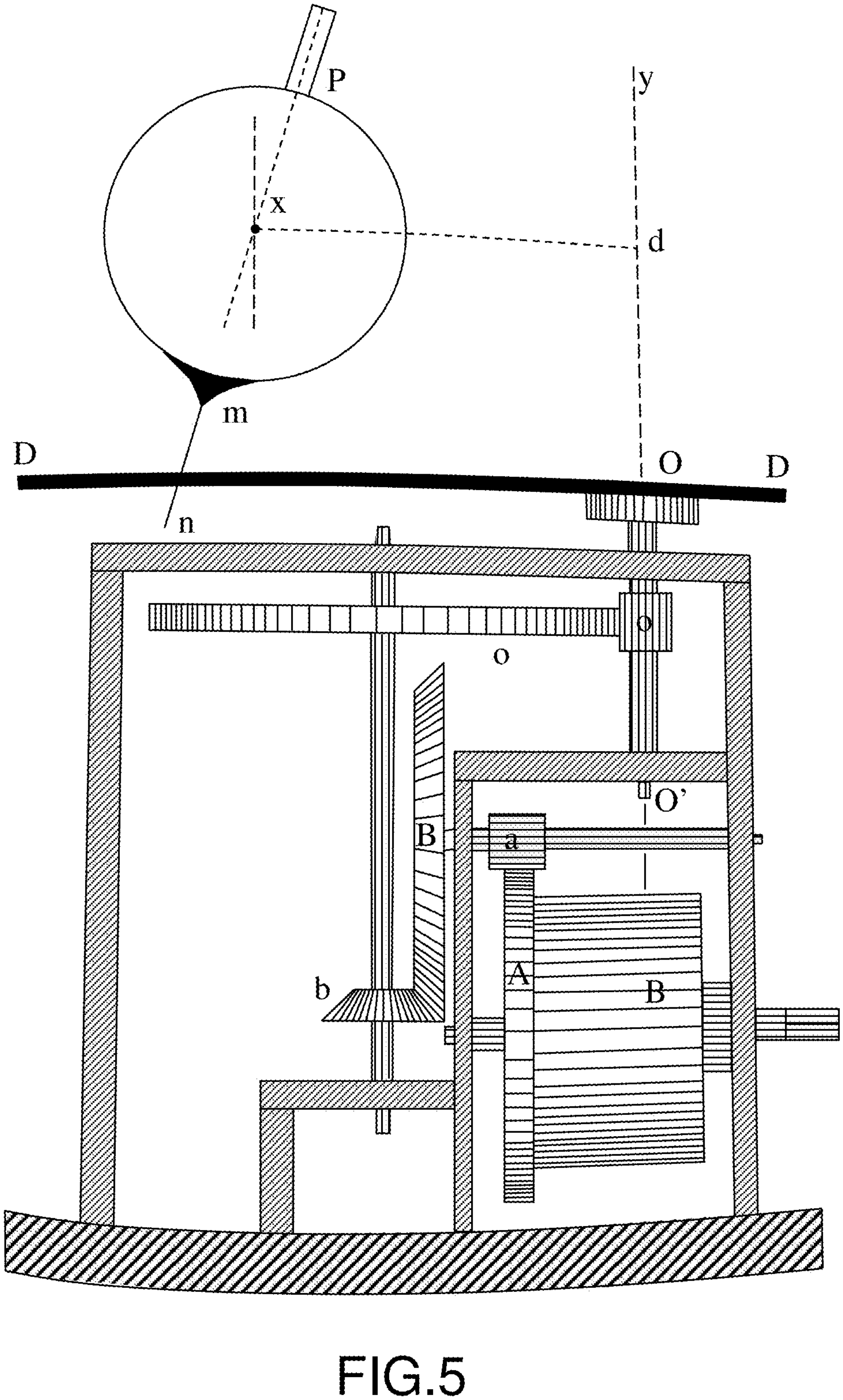
FIG.5 PRIOR ART
FIG. 5 illustrates a conical pendulum mechanism.

FIG. 4 illustrates the principle of the conical pendulum and FIG. 5 a typical conical pendulum mechanism.

Figure 6:
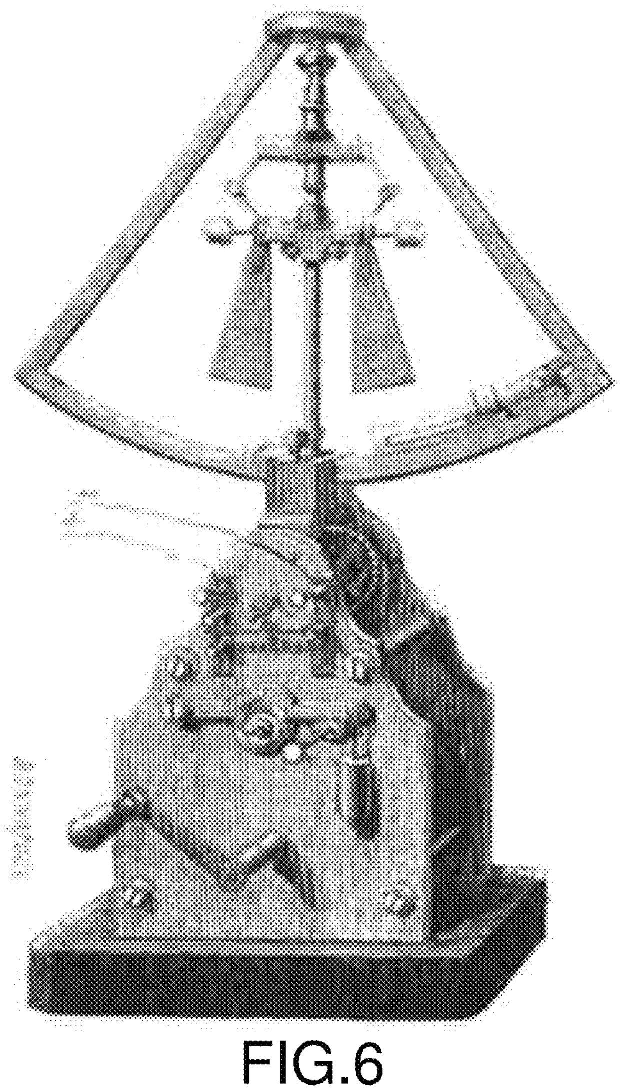
FIG.6 PRIOR ART
FIG. 6 illustrates a Villarceau governor made by Antoine Breguet.
Figure 7:
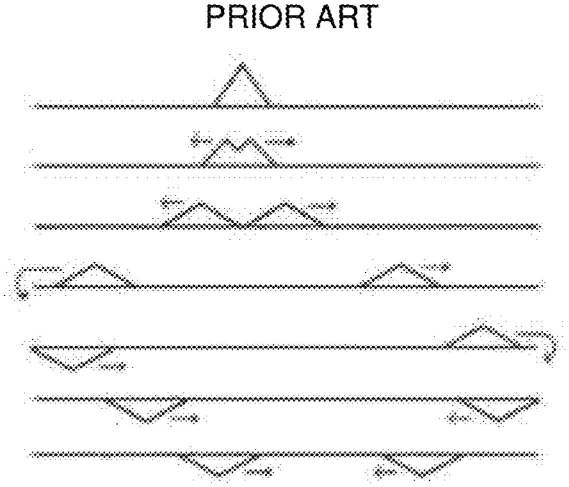
FIG.7 PRIOR ART
FIG. 7 illustrates the propagation of a singularity for a plucked string.

FIG. 6 illustrates a Villarceau governor made by Antoine Breguet in the 1870's and FIG. 7 illustrates the propagation of a singularity for a plucked string.

2.3 Rotational Versus Translational, Versus Tilting Orbiting Motion

Figure 34:
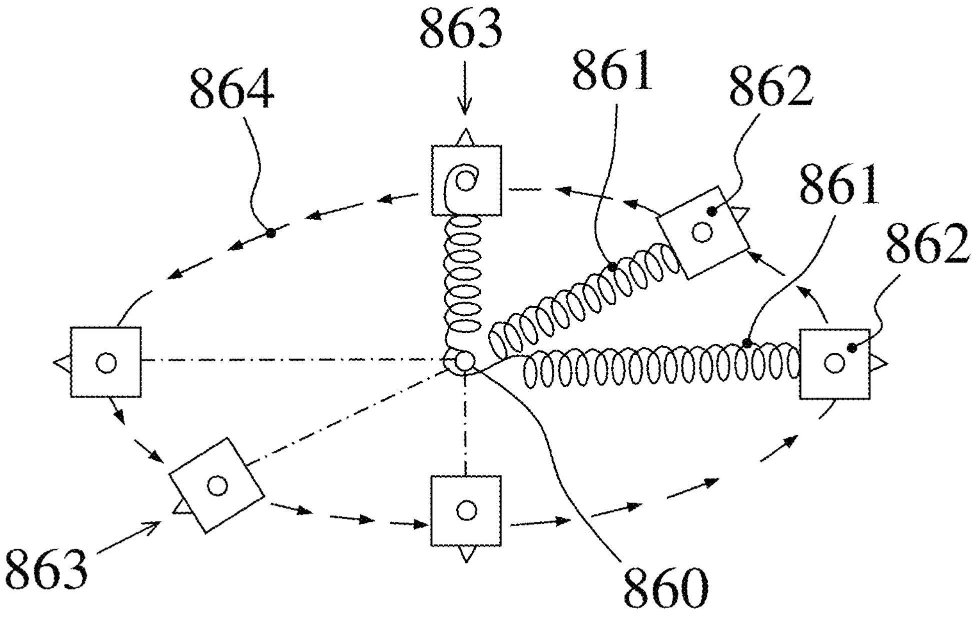
FIG. 34 illustrates a rotating spring.

Two types of isotropic harmonic oscillators having unidirectional motion are possible. One is to take a linear spring with body at its extremity, and rotate the spring and body around a fixed center. This is illustrated in FIG. 34: Rotating spring. Spring 861 with body 862 attached to its extremity is fixed to center 860 and rotates around this center so that the center of mass of the body 862 has orbit 864. The body 862 rotates around its center of mass once every full orbit, as can be seen by the rotation of the pointer 863.

Figure 35:
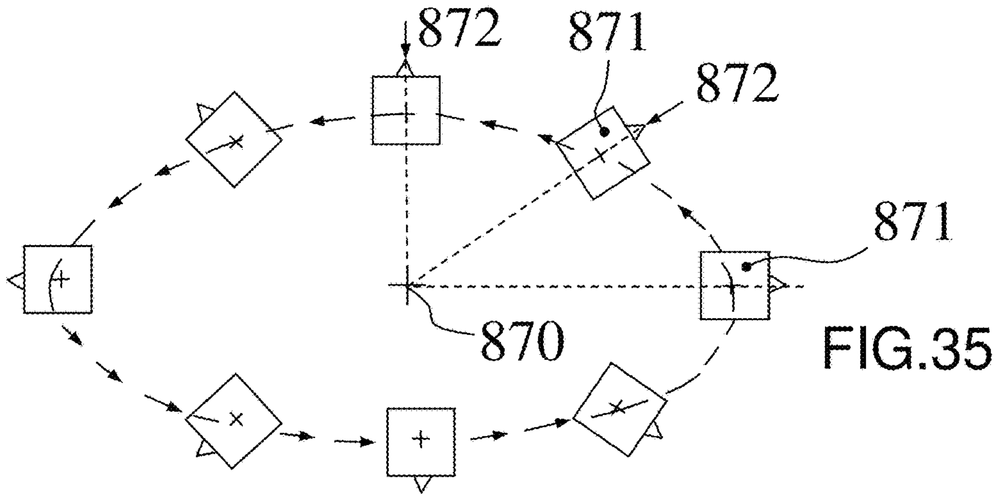
FIG. 35 illustrates a body orbiting in an elliptical orbit by rotation.

This leads to the body rotating around its center of mass with one full turn per revolution around the orbit as illustrated in FIG. 35. Example of rotational orbit. Body 871 orbits around point 870 and rotates around its axis once for every complete orbit, as can be seen by the rotation of point 872.

Figure 36:
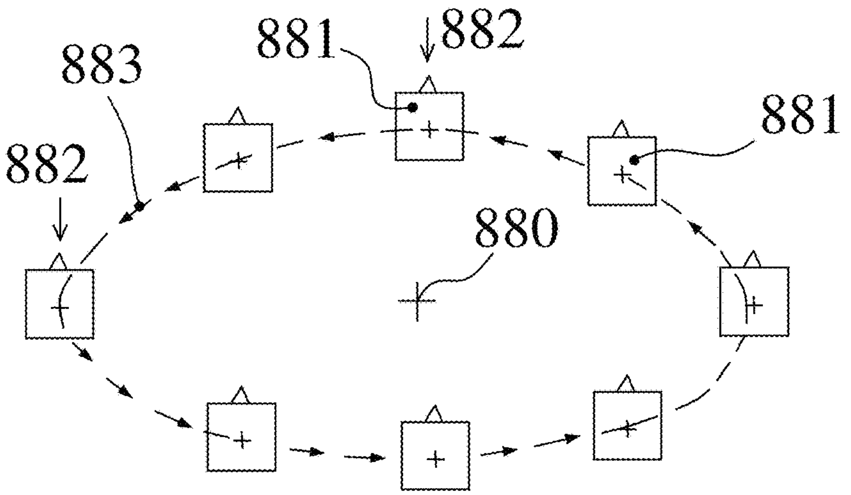
FIG. 36 illustrates a body orbiting in an elliptical orbit by translation, without rotation.

This type of spring will be called a rotational isotropic oscillator and will be described in Section 4.1. In this case, the moment of inertia of the body affects the dynamics, as the body is rotating around itself Another possible realization has the mass supported by a central isotropic spring, as described in Section 4.2. In this case, this leads to the body having no rotation around its center of mass, and we call this orbiting by translation. This is illustrated in FIG. 36: Translational orbit. Body 881 orbits around center 880, moving along orbit 883, but without rotating around its center of gravity. Its orientation remains unchanged, as seen by the constant direction of pointer 882 on the body.

In this case, the moment of inertia of the mass does not affect the dynamics. Tilting motion will occur in the mechanisms described below.

Figure 37:
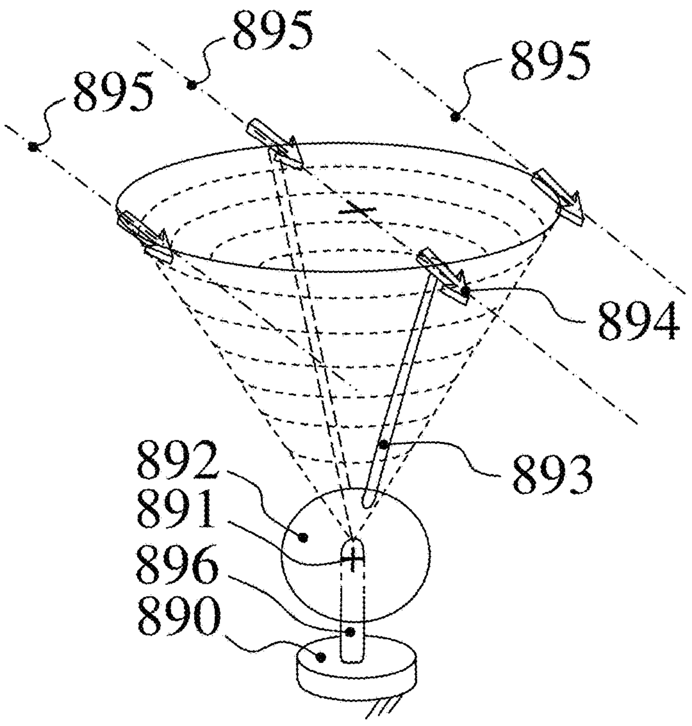
FIG. 37 illustrates a point at the end of a rigid beam orbiting in an elliptical orbit by translation, without rotation.

Another possibility is tilting motion where a limited range angular pivoting movement occurs, but not full rotations around the center of gravity of the body. Tilting motion is shown in FIG. 37: Isotropic oscillator consisting of mass 892 oscillating around joint 891 which connects it to fixed base 890 via rigid pole 896. This produces orbiting by translation as can be seen by fixing on the oscillating mass 892 a rigid pole 893 with a fixed pointer 894 at its extremity. The orbit by translation is verified by the constant orientation of the pointer which is always in the direction 895.

Figure 38:
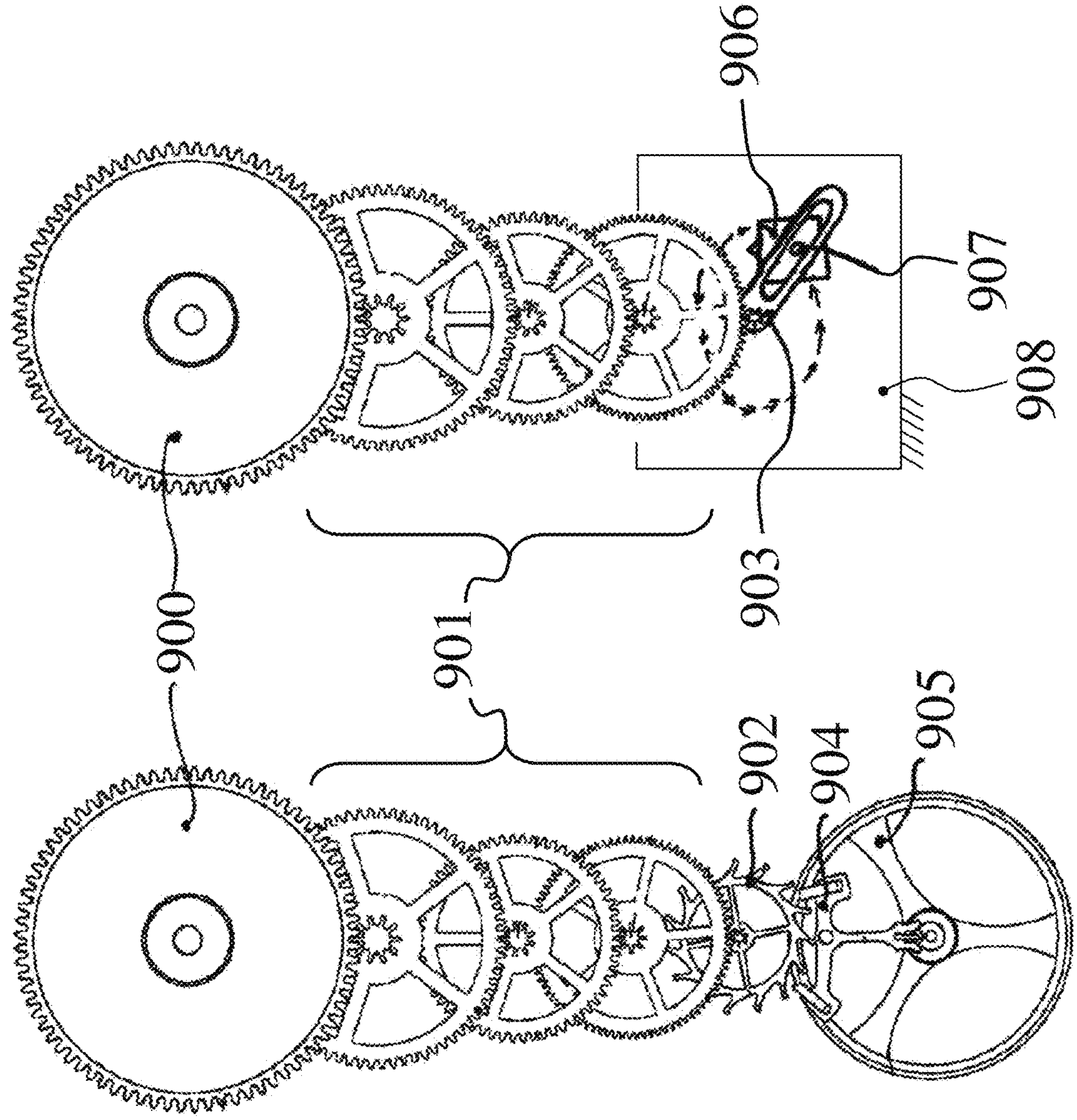
FIG. 38 illustrates how to integrate our oscillator into a standard mechanical watch or clock movement by replacing the current balance-spring and escapement with an isotropic oscillator and driving crank.

2.4 Integration of the Isotropic Harmonic Oscillator in a Standard Mechanical Movement Our time base using an isotropic oscillator will regulate a mechanical timekeeper, and this can be implemented by simply replacing the balance wheel and spiral spring oscillator with the isotropic oscillator and the escapement with a crank fixed to the last wheel of the gear train. This is illustrated in FIG. 38: On the left is the classical case. Mainspring 900 transmits energy via gear train 901 to escape wheel 902 which transmits energy intermittently to balance wheel 905 via anchor 904. On the right is our mechanism. Mainspring 900 transmits energy via gear train 901 to crank 906 which transmits energy continuously to isotropic oscillator 906 via the pin 907 travelling in a slot on this crank. The isotropic oscillator is attached to fixed frame 908, and its center of restoring force coincides with the center of the crank pinion.

3 Theoretical Requirements of the Physical Realization

In order to realize an isotropic harmonic oscillator, in accordance with the present invention, there requires a physical construction of the central restoring force. The theory of a mass moving with respect to a central restoring force is such that the resulting motion lies in a plane, however, we examine here more general isotropic harmonic oscillator where perfectly planar motion is not respected, but, the mechanism will still retain the desirable features of a harmonic oscillator.

In order for the physical realization to produce isochronous orbits for a time base, the theoretical model of Section 2 above must be adhered to as closely as possible. The spring stiffness k is independent of direction and is a constant, that is, independent of radial displacement (linear spring). In theory, there is a point mass, which therefore has moment of inertia J=0 when not rotating. The reduced mass m is isotropic and also independent of displacement. The resulting mechanism should be insensitive to gravity and to linear and angular shocks. The conditions are therefore Isotropic k. Spring stiffness k isotropic (independent of direction).

Radial k. Spring stiffness k independent of radial displacement (linear spring).

Zero J. Mass m with moment of inertia J=0.

Isotropic m. Reduced mass m isotropic (independent of direction). Radial m. Reduced mass m independent of radial displacement.

Gravity. Insensitive to gravity.

Linear shock. Insensitive to linear shock.

Angular shock. Insensitive to angular shock.

4 Realization of the Isotropic Harmonic Oscillator 4.1 Isotropy Via Radially Symmetric Springs (Volumes of Revolution)

Figure 20:
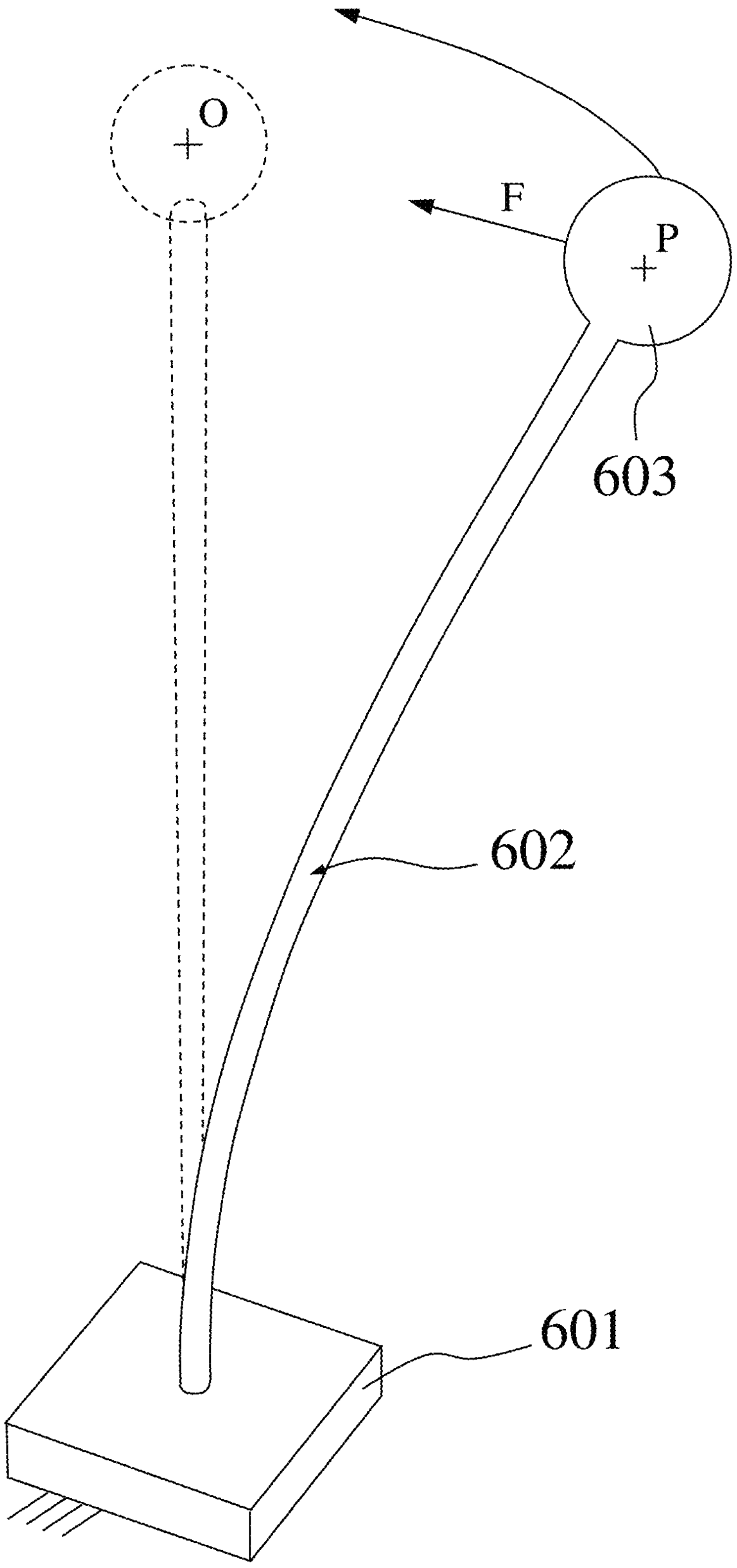
FIG.20 PRIOR ART
FIG. 20 illustrates a 2-DOF isotropic spring based on matter isotropy.

Isotropy will be realized through radially symmetric springs which are isotropic spring due to the isotropy of matter. The simplest example is shown in FIG. 20: To the fixed base 601 is attached the flexible beam 602, and at the extremity of the beam 602 is attached a mass 603. The flexible beam 602 provides a restoring force to the mass 603 such that the mechanism is attracted to its neutral state shown by the dashed figure. The mass 603 will travel in a unidirectional orbit around its neutral state. We now list which of the theoretical properties of Section 3 hold for these realizations (up to first order).

| Isotropic k | Radial k | Zero J | Isotropic m | Radial m | Gravity | Linear shock | Angular shock |
|---|---|---|---|---|---|---|---|
| Yes | Yes | Yes | Yes | No | No | No | No |

Figures 21A, 21B:
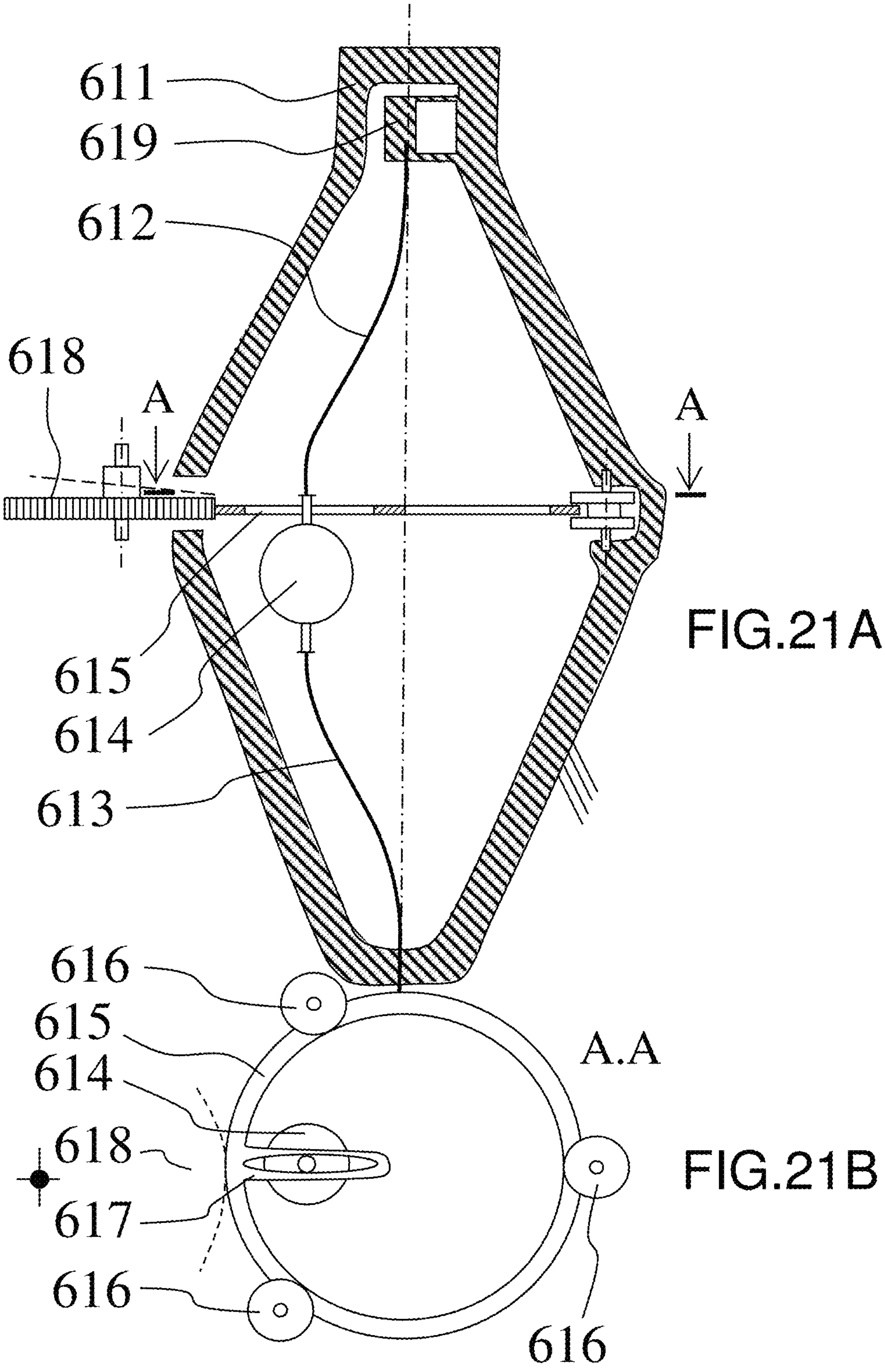
FIGS. 21A and 21B illustrates a 2-DOF isotropic spring based on matter isotropy, with mass having planar orbits, FIG. 21A being an axial cross-section and FIG. 21B being a cross-section along line A-A of FIG. 21A.

One can modify this construction of FIG. 20 to obtain planar motion, as shown in FIGS. 21A and 21B: Double rod isotropic oscillator. Side view (cross section): To the fixed frame 611 are attached two coaxial flexible rods of circular cross-section 612 and 613 holding the orbiting mass 614 at their extremities. Rod 612 is axially decoupled from the frame 611 by a one degree of freedom flexure structure 619 in order to ensure that the radial stiffness provides a linear restoring force to the mechanism. Rod 612 runs through the radial slot 617 machined in the driving ring 615. Top view: Ring 615 is guided by three rollers 616 and driven by a gear wheel 618. When a driving torque is applied to 618, the energy is transferred to the orbiting mass whose motion is thus maintained. Its properties are listed in the following table.

| Iso-tropic k | Radial k | Zero J | Iso-tropic m | Radial m | Gravity | Linear shock | Angular shock |
|---|---|---|---|---|---|---|---|
| Yes | Yes | Yes | Yes | Yes | No | No | No |

Figure 22:
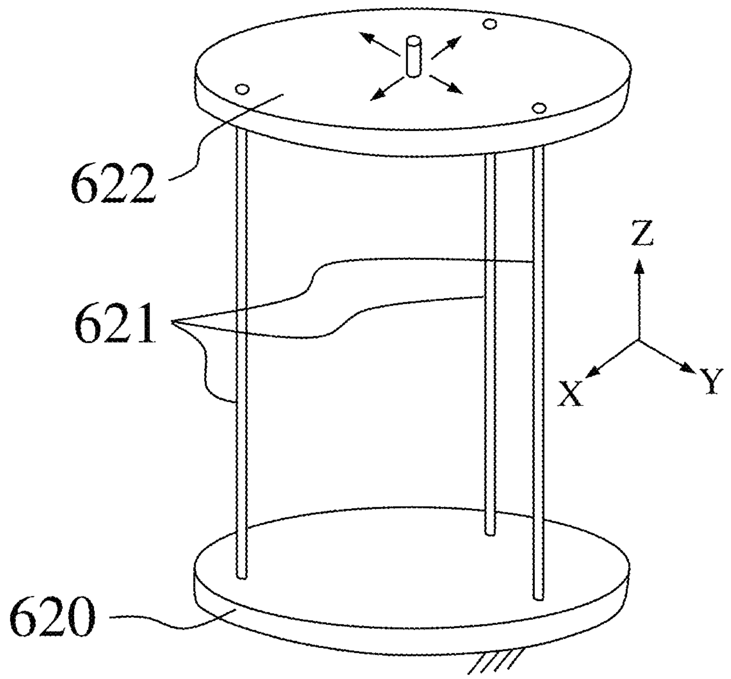
FIG. 22 illustrates a 2-DOF isotropic spring based on three isotropic cylindrical beams, increasing the planarity of motion of the mass.

A more planar motion can be achieved as shown in FIG. 22 illustrating a three rod isotropic oscillator. To the fixed frame 620 are attached three parallel flexible rods 621 of circular cross-section. To the rods 621 is attached the plate 622 which moves as an orbiting mass. This flexure arrangement gives the mass 622 three degrees of freedom: two curvilinear translations producing the orbiting motion and a rotation about an axis parallel to the rods which is not used in the application. Its properties are

| Iso-tropic k | Radial k | Zero J | Iso-tropic m | Radial m | Gravity | Linear shock | Angular shock |
|---|---|---|---|---|---|---|---|
| Yes | Yes | Yes | Yes | No | No | No | No |

Figure 23A:
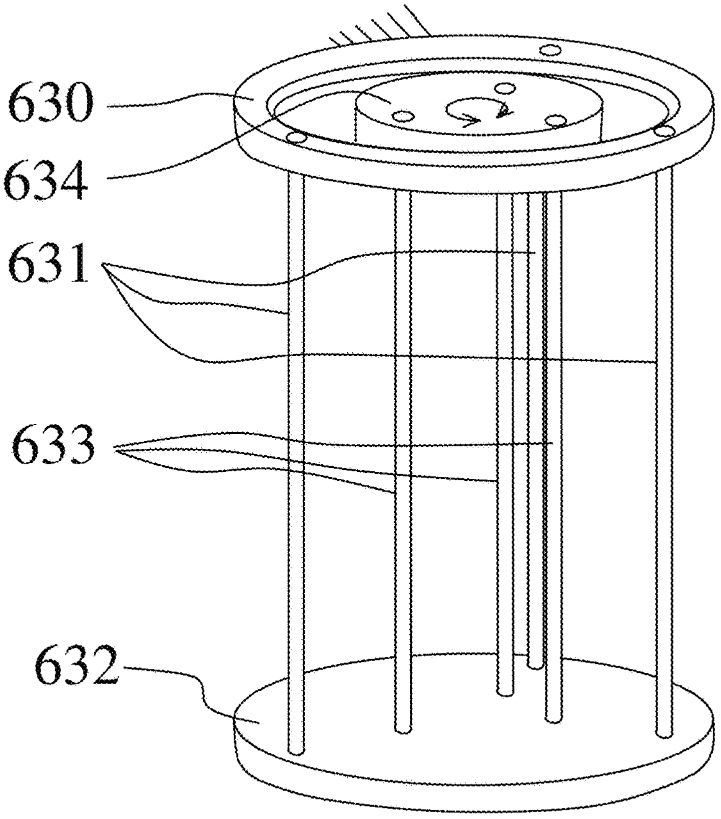
FIGS. 23A and 23B illustrate a 2-DOF isotropic spring where the non-planarity of the mechanism of FIG. 22 has been eliminated by duplication, FIG. 23A being a perspective view and FIG. 23B a top view.
Figure 23B:
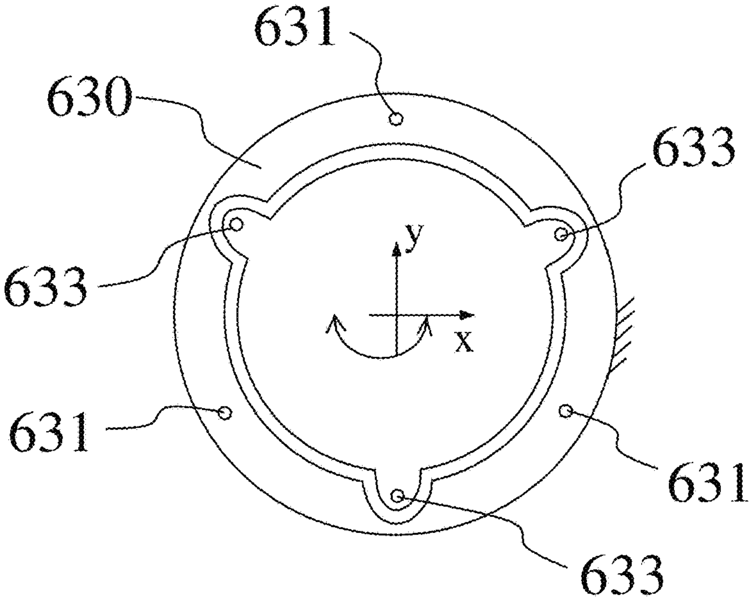

A perfectly planar motion can be achieved by doubling the mechanism of FIG. 22 as shown in FIGS. 23A and 23B (top view). Six parallel rod isotropic oscillator. To the fixed frame 630 are attached three parallel flexible rods 631 of circular cross-section. The rods 631 are attached to a light weight intermediate plate 632. The parallel flexible rods 633 are attached to 632. Rods 633 are attached to the mobile plate 634 acting as orbiting mass. This flexure arrangement gives three degrees of freedom to 634: two rectilinear translations producing the orbiting and a rotation about an axis parallel to the rods which is not used in our application. Its properties are

| Iso-tropic k | Radial k | Zero J | Iso-tropic m | Radial m | Gravity | Linear shock | Angular shock |
|---|---|---|---|---|---|---|---|
| Yes | Yes | Yes | Yes | No | No | No | No |

Figure 25B:
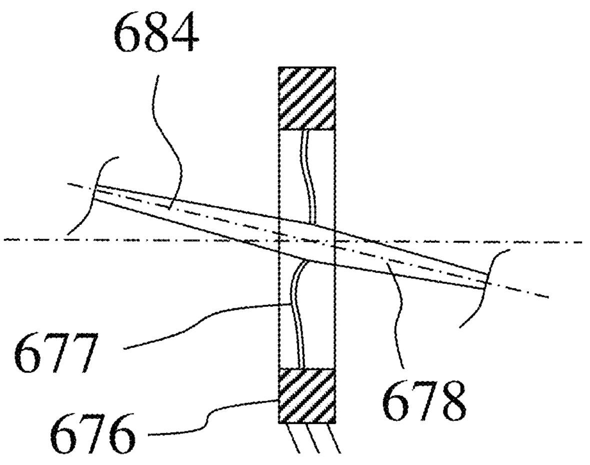
FIGS. 25A and 25B illustrate a 2-DOF isotropic spring with spring membrane and balanced dumbbell bass compensating for gravity, FIG. 25B being a cross-section of the center of FIG. 25A.
Figure 25A:
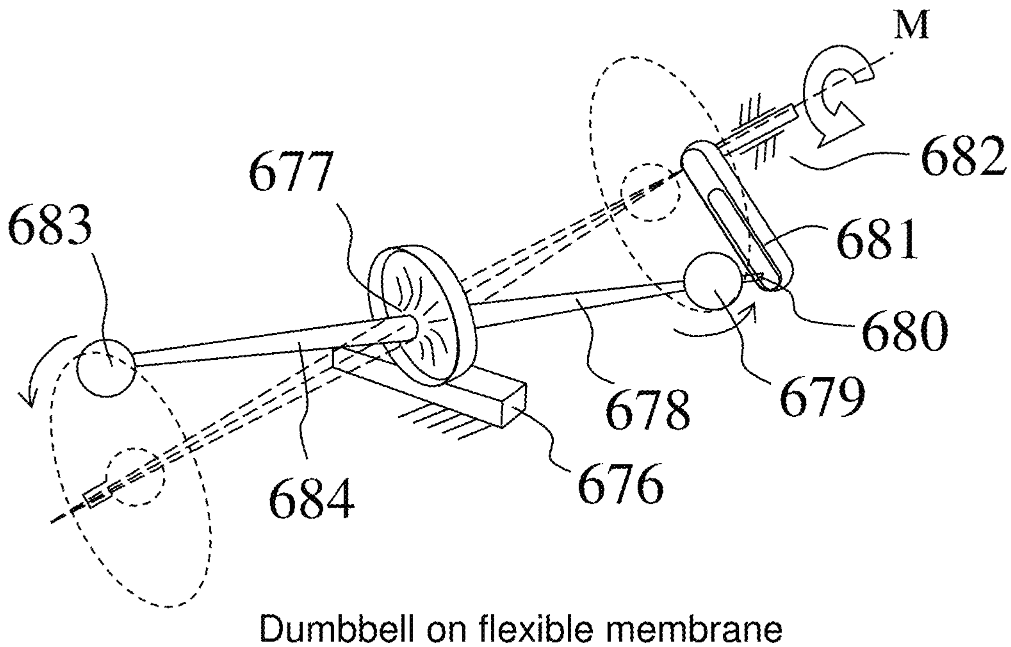

One can also use a membrane which provides an isotropic restoring force due to the isotropy of matter, as shown in FIGS. 25A and 25B: Dynamically balanced dumbbell oscillator using flexible membrane. The rigid bar 678 and 684 is attached to the fixed base 676 via a flexible membrane 677 allowing two angular degrees of freedom to the bar (rotation around the bar axis is not allowed). Orbiting masses 679 and 683 are attached to the two extremities of bar. The center of gravity of the rigid body 678, 684, 683 and 679 lies at the intersection of the plane of the membrane and the axis of the bar, so that linear accelerations produce no torque on the system, for any direction. A pin 680 is fixed axially onto 679. This pin engages into the radial slot of a rotating crank 681. The crank is attached to the fixed base by a pivot 682. The driving torque acts on the shaft of the crank which drives the orbiting mass 679, thus maintaining the system in motion. Since the dumbbell is balanced, it is intrinsically insensitive to linear acceleration, including gravity. Its properties are

| Iso-tropic k | Radial k | Zero J | Iso-tropic m | Radial m | Gravity | Linear shock | Angular shock |
|---|---|---|---|---|---|---|---|
| Yes | Yes | Yes | Yes | No | Yes | Yes | No |

4.2 Isotropy Via a Combination of Non-Symmetric Springs.

It is possible to obtain an isotropic spring by combining springs in such a way that the combined restoring force is isotropic.

Figure 26:
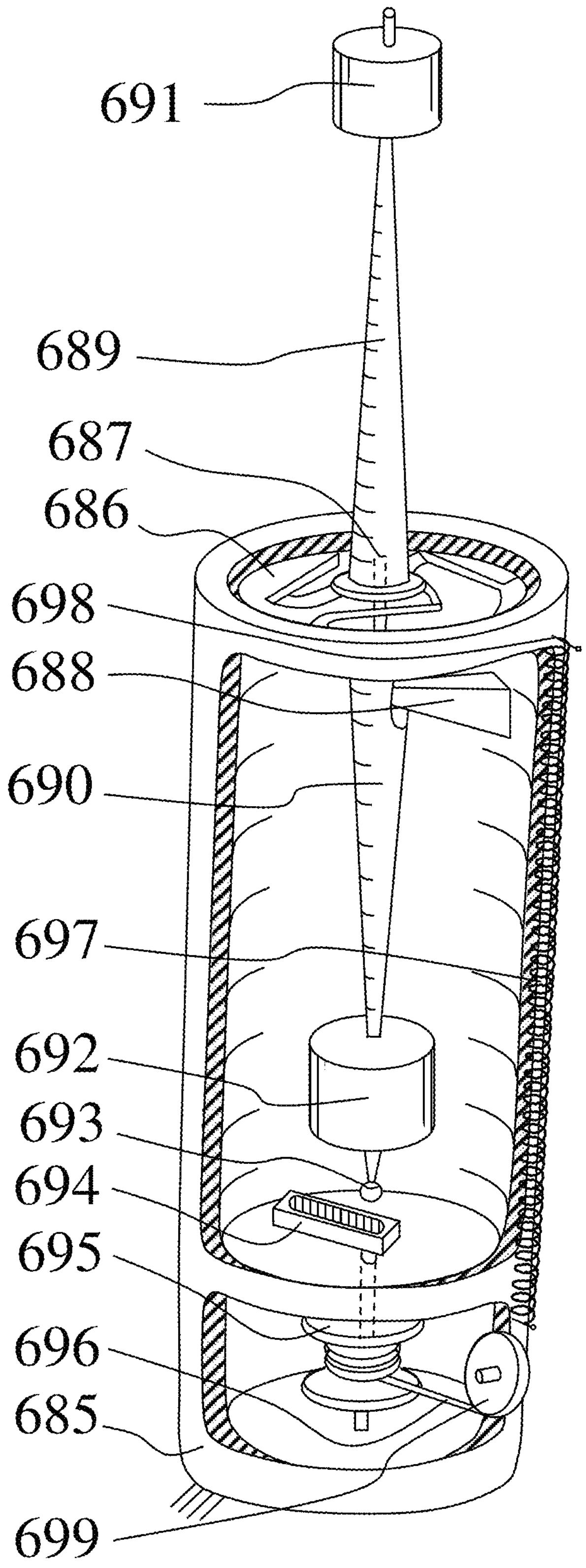
FIG. 26 illustrates a 2-DOF isotropic spring with compound springs and balanced dumbbell mass compensating for gravity.

FIG. 26 a Dynamically balanced dumbbell oscillator with four rod suspension. The rigid bar 689 and 690 is attached to the fixed frame 685 via four flexible rods forming a universal joint (see FIGS. 27 and 28A and 28B for details). The three rods lie in the horizontal plane 686 perpendicular to the rigid bar axis 689-690, and the fourth rod 687 is vertical in the 689-690 axis. Two orbiting masses 691 and 692 are attached to the extremities of the rigid bar. The center of gravity of the rigid body 691, 689, 690 and 692 lies at the intersection of the plane 686 and the axis of the bar, so that linear accelerations produce no torque on the system, for any direction. A pin 693 is fixed axially onto 692. This pin engages into the radial slot of a rotating crank 694. The crank is attached to the fixed base by a pivot 695. The driving torque is produced by a preloaded helicoidal spring 697 pulling on a thread 696 winded onto a spool which is fixed to the shaft of the crank. Its properties are

| Iso-tropic k | Radial k | Zero J | Iso-tropic m | Radial m | Gravity | Linear shock | Angular shock |
|---|---|---|---|---|---|---|---|
| Yes | Yes | Yes | Yes | No | Yes | Yes | No |

Figure 27:
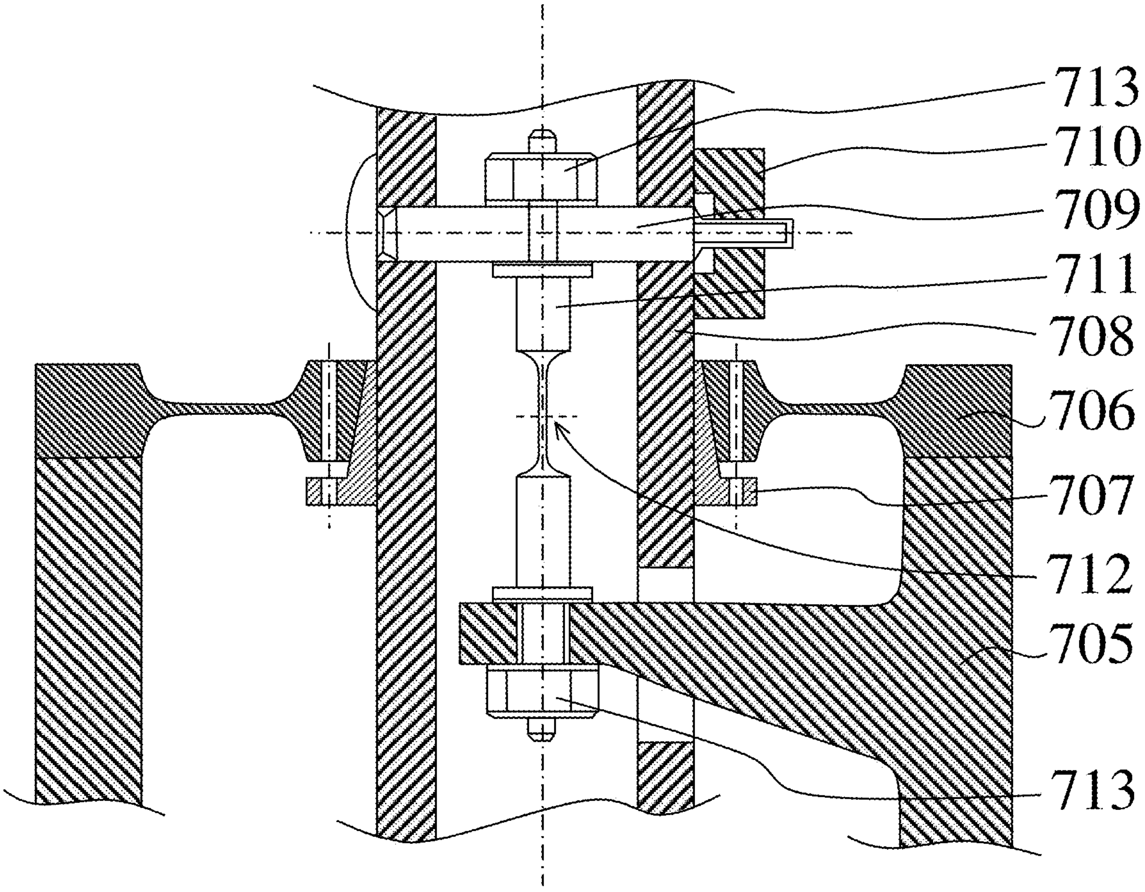
FIG. 27 illustrates a detail in cross-section of a 2-DOF isotropic spring using the compound spring of FIG. 28A to give a mass with isotropic degrees of freedom.

A cross-section of FIG. 26 is shown in FIG. 27: Universal joint based on four flexible rods. A four degrees of freedom flexure structure similar to the one shown in FIGS. 28A and 28B connects the rigid frame 705 to the mobile tube 708. A conical attachment 707 is used for the mechanical connection. A fourth vertical rod 712 links 705 to 708. The rod is machined into a large diameter rigid bar 711. Bar 711 is attached to tube 708 via a horizontal pin 709. The arrangement gives two angular degrees of freedom to the tube 708 with respect to the base 705. Its properties are

| Iso-tropic k | Radial k | Zero J | Iso-tropic m | Radial m | Gravity | Linear shock | Angular shock |
|---|---|---|---|---|---|---|---|
| Yes | Yes | Yes | Yes | No | No | No | No |

Figure 28B:
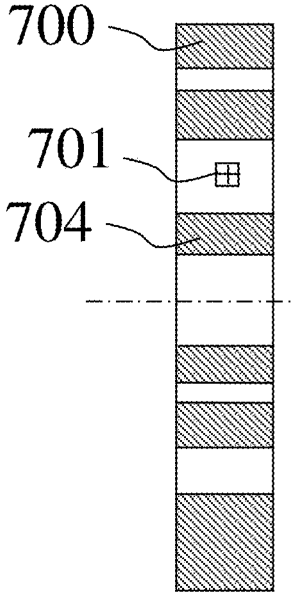
FIGS. 28A and 28B illustrate the 4-DOF spring used in the mechanism illustrated in FIG. 27, FIG. 28A being a top view and FIG. 28B a cross-section view along line A-A of FIG. 28A.
Figure 28A:
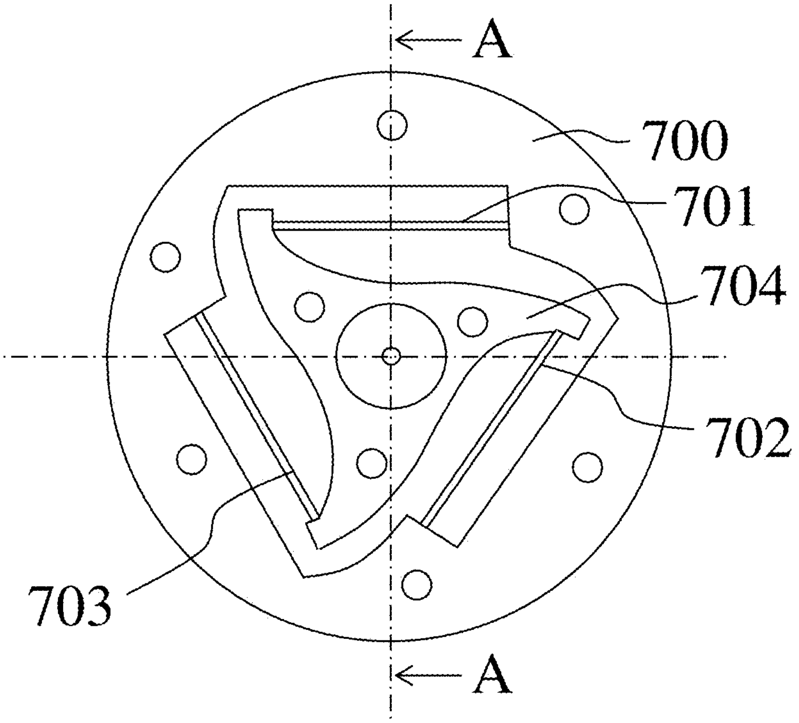

The mechanisms of FIGS. 26 and 27 relies on a flexure structure illustrated in FIGS. 28A and 28B: Four degree of freedom flexure structure. The mobile rigid body 704 is attached to the fixed base 700 via three rods 701, 702 and 703 all lying in the same horizontal plane. The rods are oriented at 120 degrees with respect to each other. An alternate configurations have the rods oriented at other angles.

Figure 29:
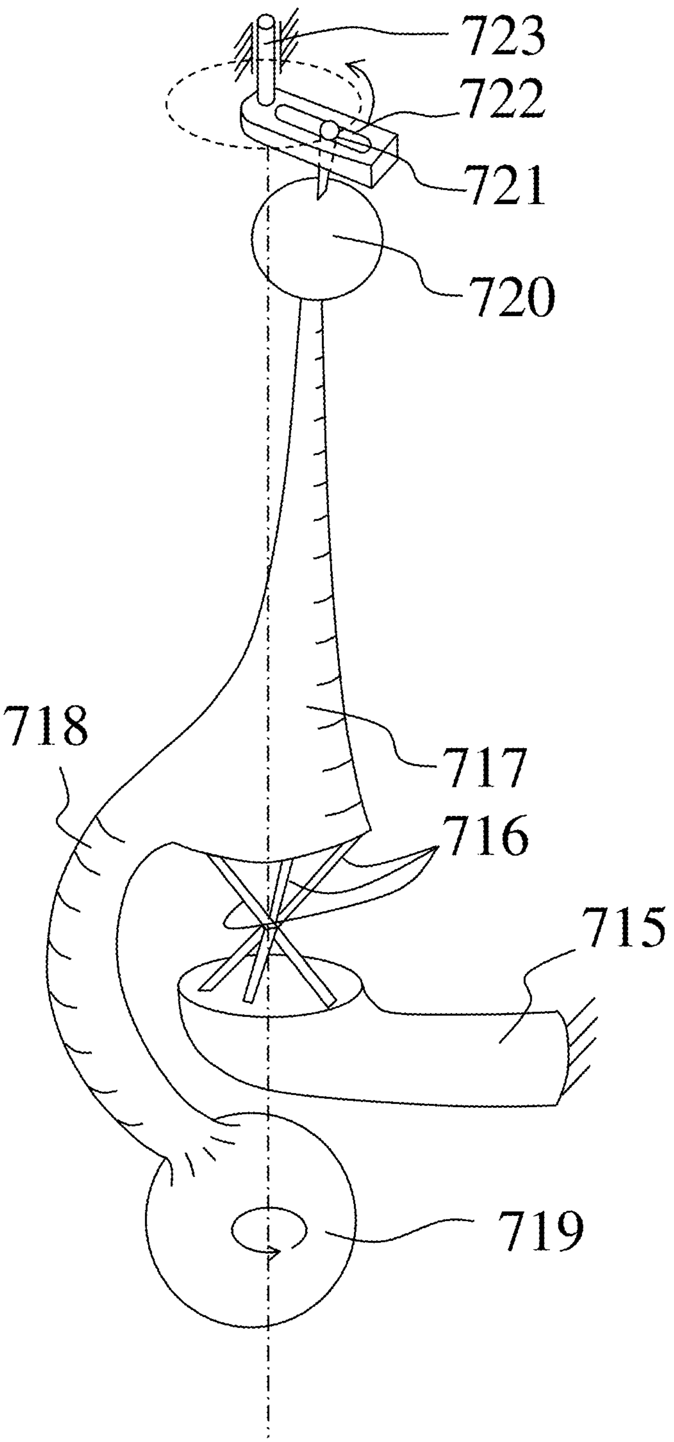
FIG. 29 illustrates a 2-DOF isotropic spring with spring comprising three angled beams and balanced dumbbell mass compensating for gravity.

An alternate dumbbell design in given in FIG. 29: Dynamically balanced dumbbell oscillator with three rod suspension. The rigid bar 717 and 718 is attached to the fixed frame 715 via three flexible rods 716 forming a ball joint. A pin 721 is fixed axially onto 720. This pin engages into the radial slot of a rotating crank 722. The crank is attached to the fixed base by a pivot 723. The center of gravity of the rigid body 717, 718, 719 and 720 lies at the intersection of the three flexible rods and is the kinematic center of rotation of the ball joint, so that linear accelerations produce no torque on the system, for any direction. The driving torque acts onto the shaft of the crank. Its properties are

| Isotropic k | Radial k | Zero J | Isotropic m | Radial m | Gravity | Linear shock | Angular shock |
|---|---|---|---|---|---|---|---|
| Yes | Yes | Yes | Yes | No | Yes | Yes | No |

4.3 Isotropic Harmonic Oscillators with Spherical Mass

Figure 30:
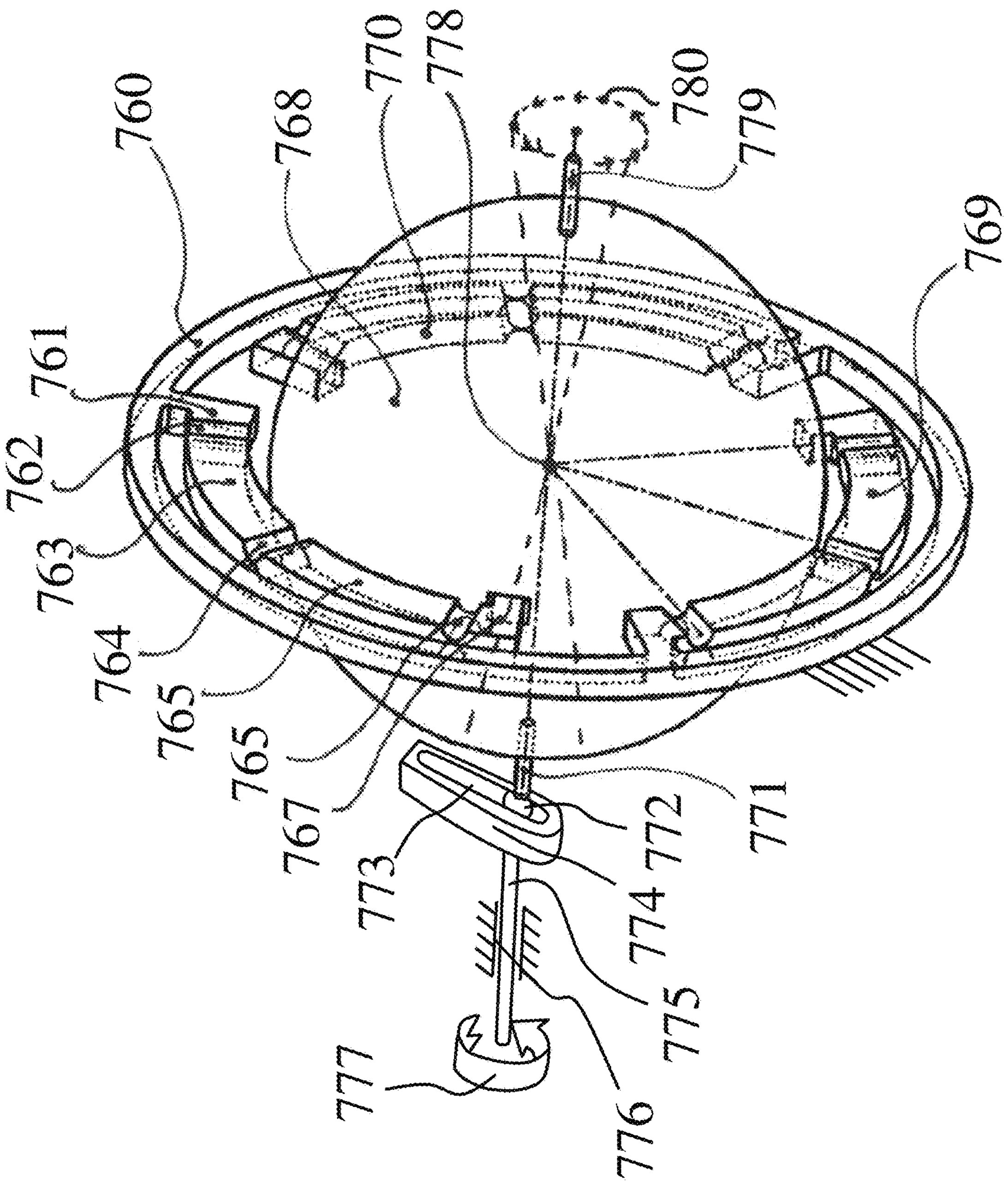
FIG. 30 illustrates a 2-DOF isotropic spring with spherical mass and equatorial flexure springs based on flexure pivots.

A design with a spherical mass is presented in FIG. 30. The spherical mass 768 (filled sphere or spherical shell) is connected to the fixed annular frame 760 via a compliant mechanism consisting of leg 761 to 767, leg 769 and leg 770. Legs 769 and 770 are constructed as leg 761-770 and their description follows that of leg 761-770. The sphere is connected to the leg at 767 (and its analogs on 769 and 770), which connects to fixed frame 760 at 761. The leg 761 to 767 is a three of freedom compliant mechanism where the notches 762 and 764 are flexure pivots. The planar configuration of the compliant legs 761-770 constitute a universal joint whose rotation axes lies in the plane of the annular ring 760. In particular, the sphere cannot rotate around the axis 771 to 779. For small amplitudes, sphere motion is such that 772 describes an elliptical orbit, and the same by symmetry for 779, as shown in 780. Sphere rotation is maintained via crank 776 which is rigidly connected to the slot 774. Crank 774 is assumed to have torque 777 and to be connected to the frame by a pivot joint at 776, for example, with ball bearings. The pin 771 is rigidly connected to the sphere and during sphere rotation will move along slot 774 so that it is no longer aligned with the crank axis 776 and so that torque 777 exerts a force on 771, thus maintaining sphere rotation. The center of gravity 778 of the sphere 768 lies at the intersection of the plane 760 and the axis 771-779, so that linear accelerations produce no torque on the system, for any direction. An alternative construction is to remove notches 764 on all three legs. Other alternative constructions use 1, 2, 4 or more legs. Its properties are

| Isotropic k | Radial k | Zero J | Isotropic m | Radial m | Gravity | Linear shock | Angular shock |
|---|---|---|---|---|---|---|---|
| Yes | Yes | Yes | Yes | No | Yes | Yes | No |

Figure 31:
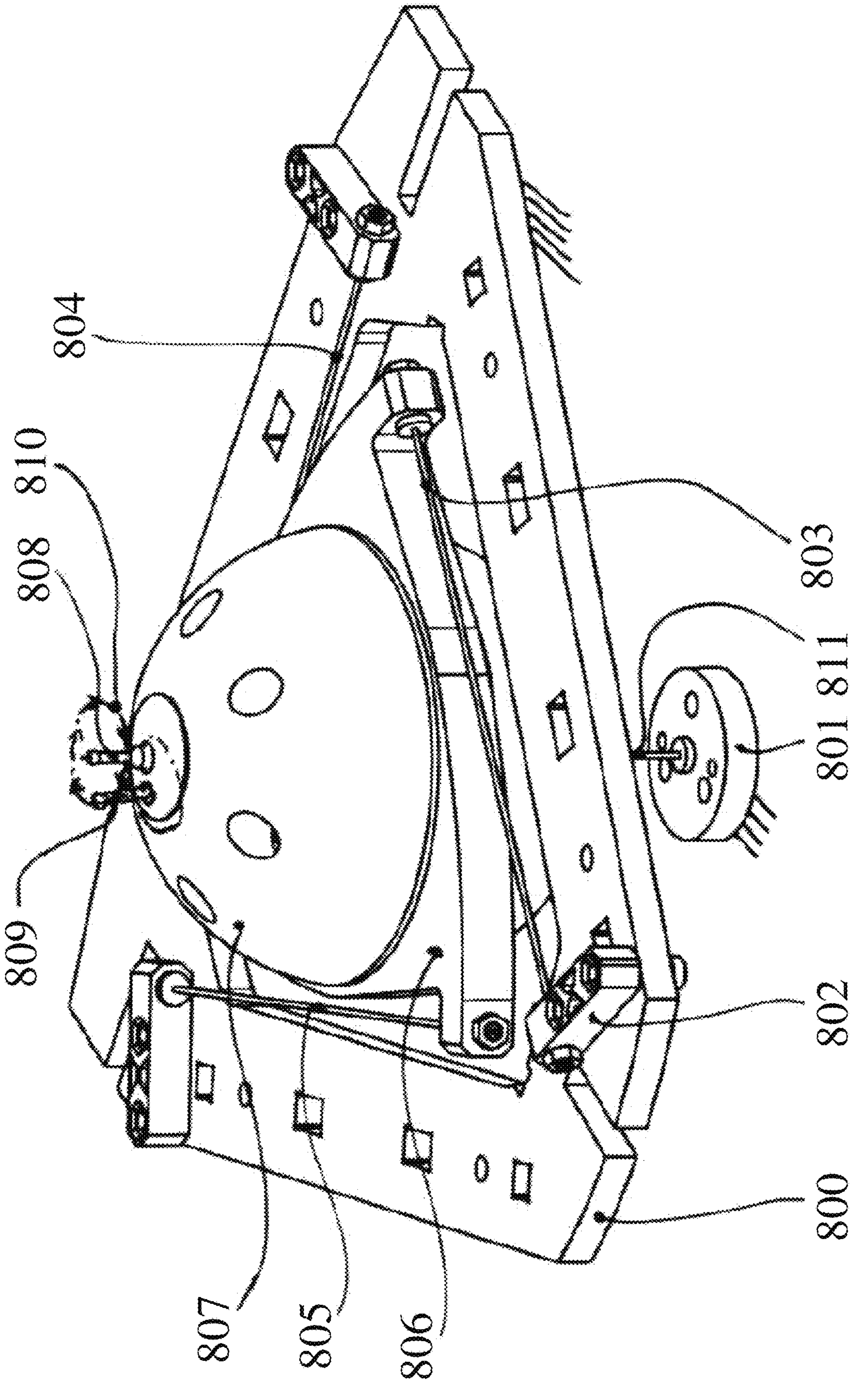
FIG. 31 illustrates a 2-DOF isotropic spring with spherical mass and equatorial beam springs.
Figure 32:
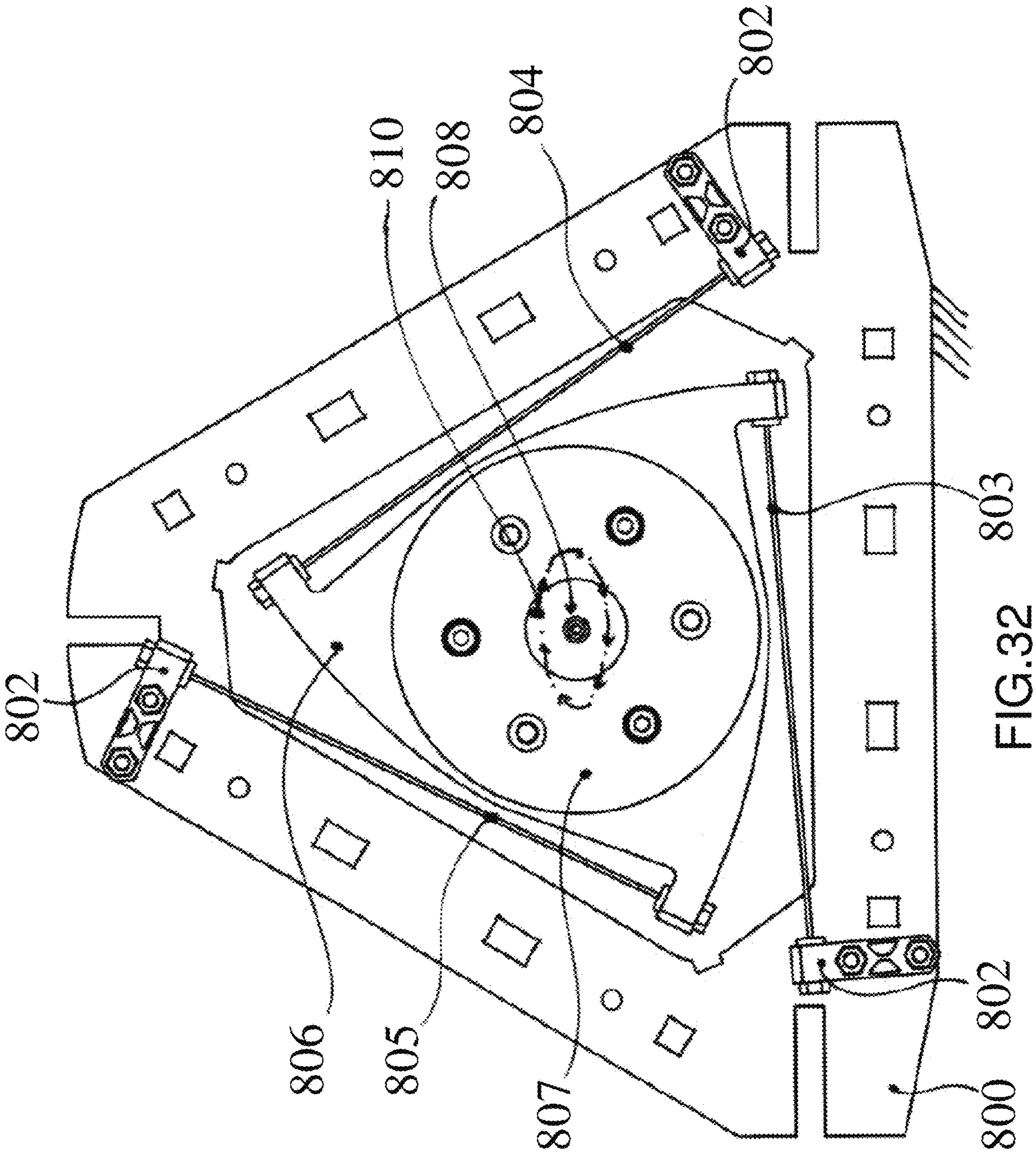
FIG. 32 illustrates the 2-DOF isotropic spring with spherical mass of FIG. 31, top view.
Figure 33:
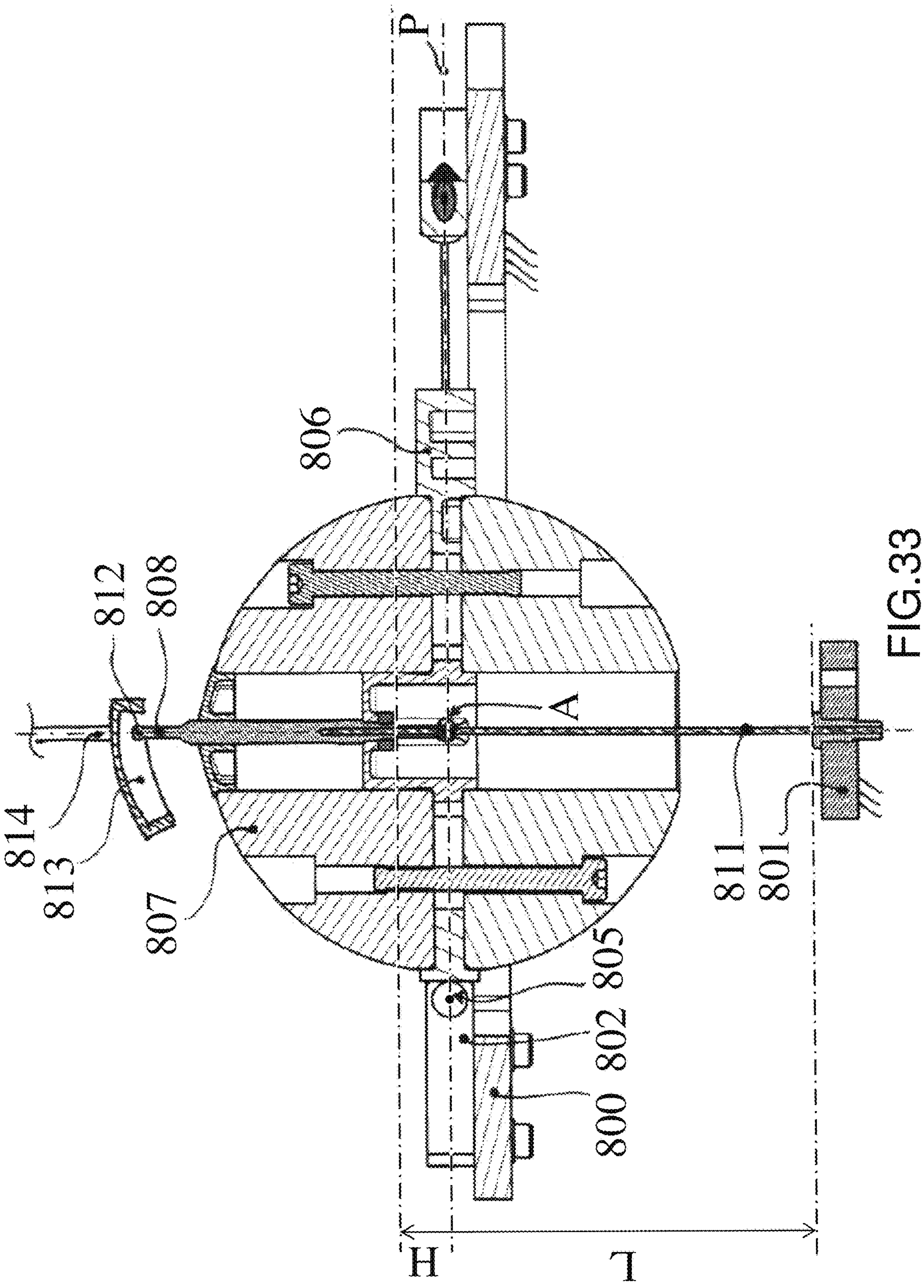
FIG. 33 illustrates the 2-DOF isotropic spring with spherical mass of FIG. 31, cross-section view.

An alternate sphere mechanism is given in FIGS. 31, 32 and 33: A realization of the two-rotational-degrees-of-freedom harmonic oscillator. The spherical mass 807 (filled sphere or spherical shell including a cylindrical opening letting space to mount the flexible rod 811) is connected to the fixed frame 800 and fixed block 801 via a two-rotational-degrees of freedom compliant mechanism. The compliant mechanism consists of a rigid plate 806 holding 807, three coplanar (plane labeled P on FIG. 33) flexible rods 803, 804 and 805 and a fourth flexible rod 811 that is perpendicular to plane P. Three rigid fixed blocks 802 are used to clamp the fixed ends of the rods. The active length (distance between the two clamping points) of 811 is labeled L on FIG. 33. The point of intersection (point labeled A on FIG. 33) between plane P and the axis of 811 is located exactly at the center of gravity of the sphere or spherical shell 807. For increased mechanism accuracy, plane P should intersects 811 at a distance H=L/8 from its clamping point into 807. This ratio cancels the parasitic shifts that accompany the rotations of flexure pivots. This compliant mechanism gives two rotational-degrees-of-freedom to 807 that are rotations whose axes are located in plane P and runs through point A. (Note: these degrees of freedom are the same as those of a classical constant-velocity joint linking the mass 807 to a non-rotating base 800 and 801, thus blocking the rotation of the mass 807 about the axis that is collinear with the axis of pin 808). This compliant mechanism leads to motions of the sphere or spherical shell 807 that are devoid of any displacement of the center of gravity of 807. As a result, this oscillator is highly insensitive to gravity and to linear accelerations in all directions.

A rigid pin 808 is fixed to 807 on the axis of 811. The tip 812 of pin 808 has a spherical shape. As 807 oscillates around its neutral position, the tip of pin 808 follows a continuous trajectory called the orbit (labeled 810 on the figures).

The tip 812 of the pin engages into a slot 813 machined into the driving crank 814 whose rotation axis is collinear with the axis of rod 811. As a driving torque is applied onto 814, the crank pushes 812 forward along its orbiting trajectory, thus maintaining the mechanism into continuous motion, even in the presence of mechanical losses (damping effects). Its properties are

| Isotropic k | Radial k | Zero J | Isotropic m | Radial m | Gravity | Linear shock | Angular shock |
|---|---|---|---|---|---|---|---|
| Yes | Yes | Yes | Yes | No | Yes | Yes | No |

Figure 39:
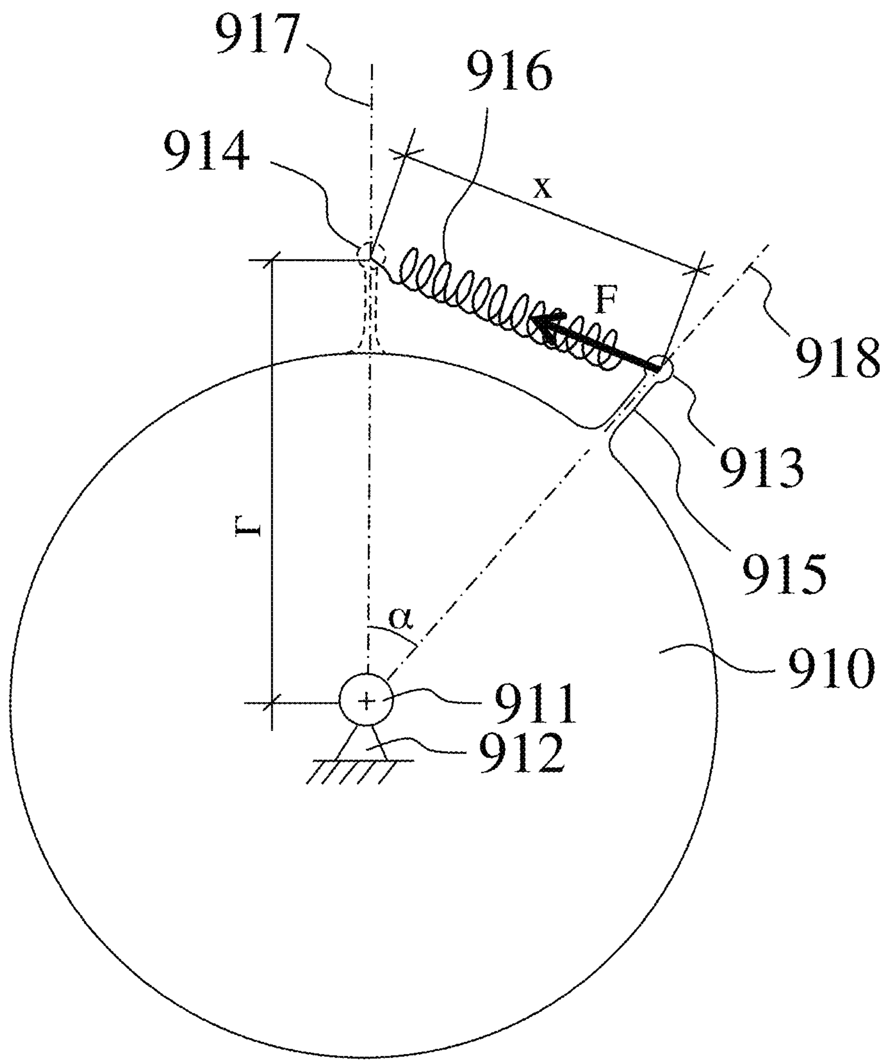
FIG. 39 illustrates the conceptual basis of an oscillator with spherical mass and polar spring yielding to perfect isochronism of constant angular speed orbits having constant latitude.
Figure 40:
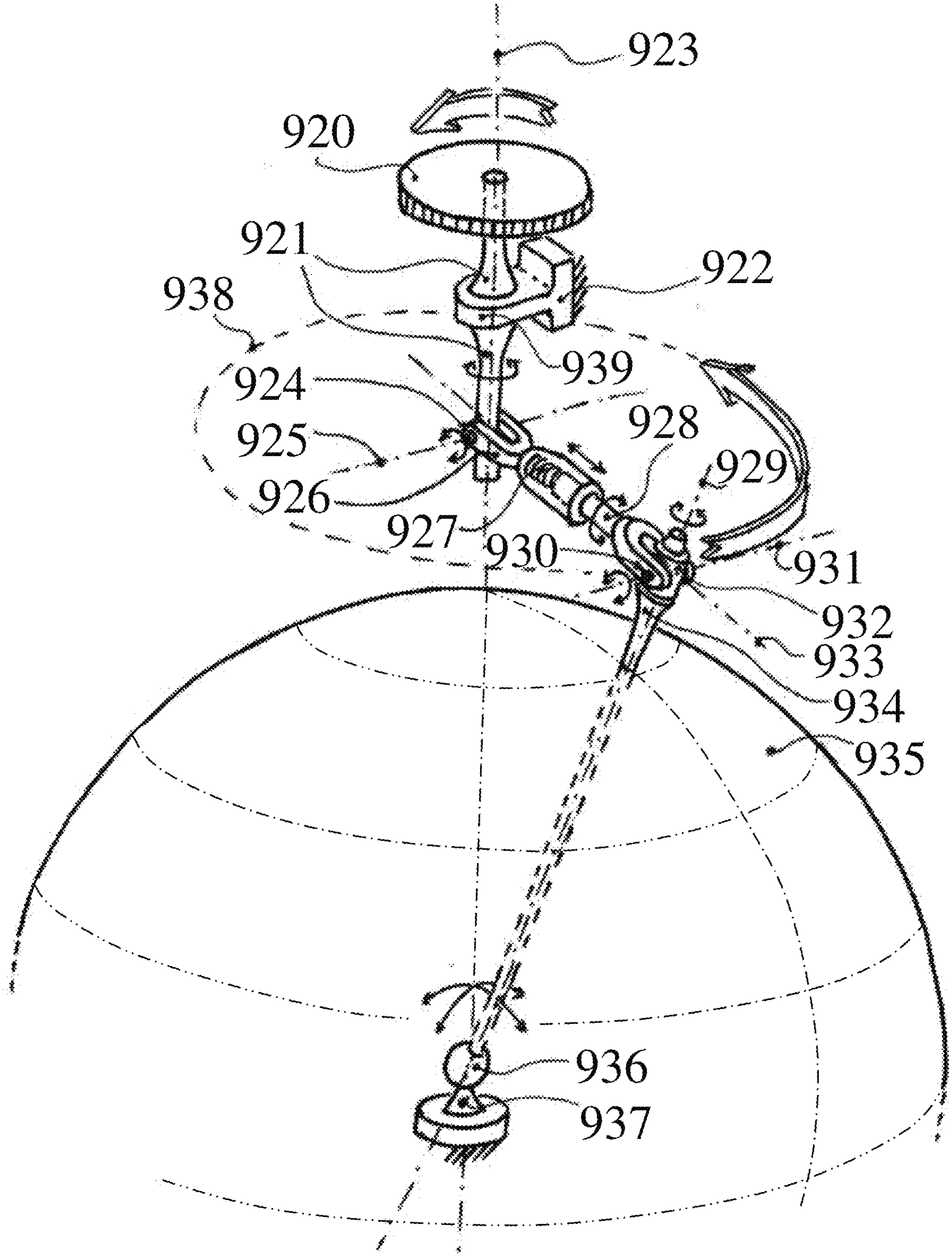
FIG. 40 illustrates a conceptual model of a mechanism implementing the polar spring spherical oscillator of FIG. 39 along with a crank which maintains oscillator energy.
Figure 41:
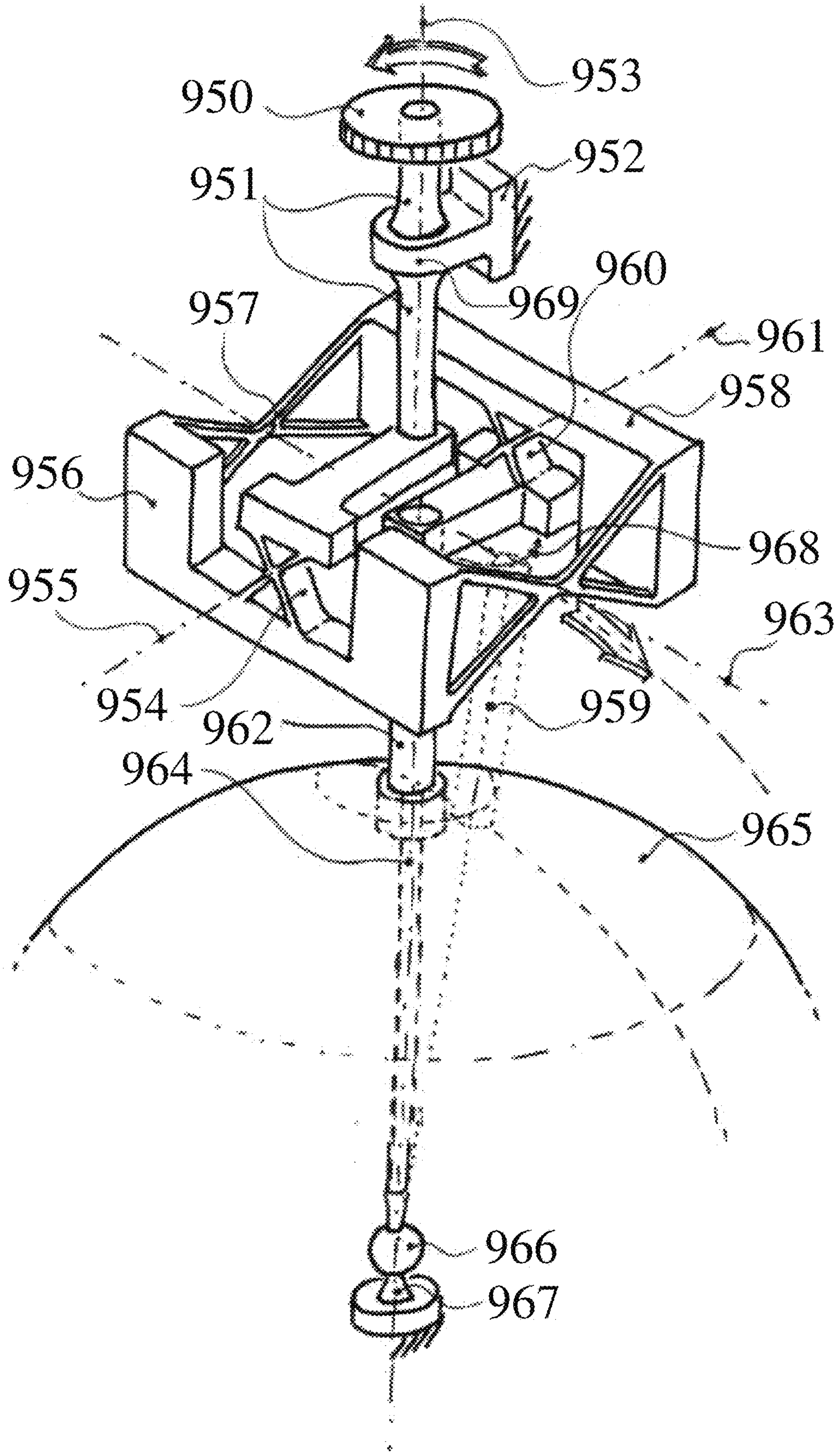
FIG. 41 illustrates a fully functional mechanism implementing the spherical mass and polar spring concept of FIG. 39 along with a crank which maintains oscillator energy.

An alternate embodiment of a sphere mechanism is given in FIGS. 39, 40 and 41.

FIG. 39 presents a two dimensional drawing of the central restoring force principle based on a polar spring, by which we mean that the linear spring 916 is attached to the north pole 913 of the oscillating sphere 910. Spring 916 connects the tip 913 of the driving pin 915 to point 914. Point 914 corresponds to the position of the tip 913 when the sphere 910 is in its neutral position, in particular, point 913 and 914 are at the same distance r from the center of the sphere. The sphere's neutral position is defined as the rotational position of the sphere for which the axis 918 of the driving pin 915 is collinear with the axis of rotation of the driving crank (923 on FIG. 40 and 953 on FIG. 41). The constant velocity joint 911 ensures that this position is unique, i.e., represents a unique rotational position of the sphere. Spring 916 produces an elastic restoring force $F=-k\cdot X$ (where k is the stiffness constant of the spring), so proportional to the elongation X of the spring, where X equals the distance between point 914 and point 913. The direction of force F is along the line connecting 914 to 913. The oscillating mass is the sphere or spherical shell 910 which is attached to the fixed base 912 via a constant velocity joint 911. Joint 911 has 2 rotational degrees of freedom and blocks the third rotational degree of freedom of the sphere, which is a rotation about axis 918. A possible embodiment of joint 911 is the four rods elastic suspension shown on FIGS. 31, 32 and 33 or the planar mechanism described on FIG. 30. This arrangement results in a non-linear central restoring torque on the sphere which equals $M=-2\,k\,r^2\sin(\alpha/2)$. Dynamic modeling of the free oscillations of this polar spring mechanism on constant angular speed circular orbits of constant latitude, assuming joint 911 has zero stiffness, shows that the free oscillations have the same period for all angles α, i.e. the oscillator is therefore perfectly isochronous on such orbits and can be used as a precise time base.

FIG. 40 is a three dimensional illustration of a kinematic model of the conceptual mechanism illustrated in FIG. 39. The crank wheel 920 receives the driving torque. The shaft 921 of the crank wheel is guided by a rotational bearing 939, turning about axis 923, to the fixed base 922. A pivot 924 turns about axis 925, perpendicular to axis 923, and connects the shaft 921 to the fork 926. The shaft of fork 926 has two degrees of freedom: it is telescopic (one translational degree of freedom along the axis 933 of the shaft) and is free to rotate in torsion (one rotational degree of freedom around the axis 933 of the shaft). A linear polar spring 927 acts on the telescopic degree of freedom of the shaft to provide the restoring force of spring 916 of FIG. 39. A second fork 930 at the second extremity of the shaft holds a pivot 930, rotating about axis 931 intersecting orthogonally the axis 929 of pin, and is connected to an intermediate cylinder 932. The cylinder 932 is mounted onto the driving pin 924 of the sphere 935 via a pivot rotating about the axis of the pin 929. The oscillating mass is the sphere or spherical shell 935 which is attached to the fixed base 937 via a constant velocity joint 936. Joint 936 has 2 rotational degrees of freedom and blocks the third rotational degree of freedom of the sphere which is a rotation about axis 929. A possible embodiment of joint 936 is the four rods elastic suspension shown in FIGS. 31, 32 and 33 or the planar mechanism illustrated in FIG. 30. The complete mechanism has two degrees of freedom and is not over-constrained. It implements both the elastic restoring force and the crank maintaining torque of FIG. 39 allowing the torque applied onto the crank wheel 920 to be transmitted to the sphere, thus maintaining its oscillating motion on the orbit 938.

FIG. 41 presents a possible embodiment of the mechanism described in FIG. 40.

The crank wheel 950 receives the driving torque. The shaft 951 of the crank wheel is guided by a rotational bearing 969 turning about axis 953, to the fixed base 952. A flexure pivot 954, turns about axis 955 which is perpendicular to axis 953, and connects the shaft 951 to a body 956. The body 956 is connected to body 958 by a flexure structure 957 having two degrees of freedom: one translational degree of freedom along the axis 963 and one rotational degree of freedom around the axis 963. In addition to this kinematic function, flexure 957 provides the elastic restoring force function of the spring 927 of FIG. 40 or spring 916 of FIG. 39 and obeys the force law $F=-k\cdot X$, i.e., its restoring force increases linearly with X and equals zero when the sphere is in its neutral position. The neutral position is defined as the position where axis 959 of the driving pin and 953 of the crank shaft are collinear. As in FIG. 39, the neutral position of the sphere is unique due to the constant velocity joint 966. A second cross-spring pivot 960 turning about axis 961 which intersect orthogonally the axis 959 of the pin, connects body 958 to an intermediate cylinder 962. The cylinder 932 is mounted onto the driving pin 964 of the sphere 965 via a pivot rotating about the axis of the pin 959. The oscillating mass is the sphere or spherical shell 965 which is attached to the fixed base 967 via a constant velocity joint 966. Joint 966 has two rotational degrees of freedom and blocks the third rotational degree of freedom of the sphere which is a rotation about axis 969. A possible embodiment of joint 966 is the four rod elastic suspension illustrated in FIGS. 31, 32 and 33 or the planar mechanism illustrated in FIG. 30. The complete mechanism has two degrees of freedom. It provides both the elastic restoring force and the crank driving function described in FIG. 39, allowing the torque applied to the crank wheel 950 to be transmitted to the sphere, thus maintaining its oscillating motion on the orbit 968.

4.4 XY Translational Isotropic Harmonic Oscillators

It is possible to construct isotropic harmonic oscillators using orthogonal translational springs in the XY plane. However, these constructions will not be considered here and are the subject of a co-pending application.

5 Compensation Mechanisms

In order to place the new oscillator in a portable timekeeper as an exemplary embodiment of the present invention, it is necessary to address forces that could influence the correct functioning of the oscillator. These include gravity and shocks.

5.1 Compensation for Gravity

For a portable timekeeper, compensation is required.

Figure 24B:
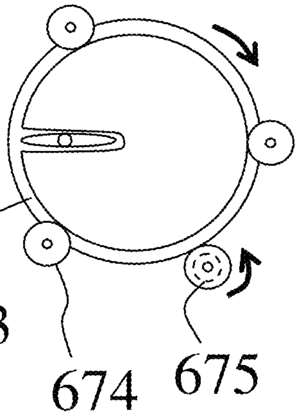
FIGS. 24A and 24B illustrate a 2-DOF isotropic spring which has been compensated to balance linear and angular acceleration, FIG. 24A being an axial cross-section and FIG. 24B being a cross-section of FIG. 21A.
Figure 24A:
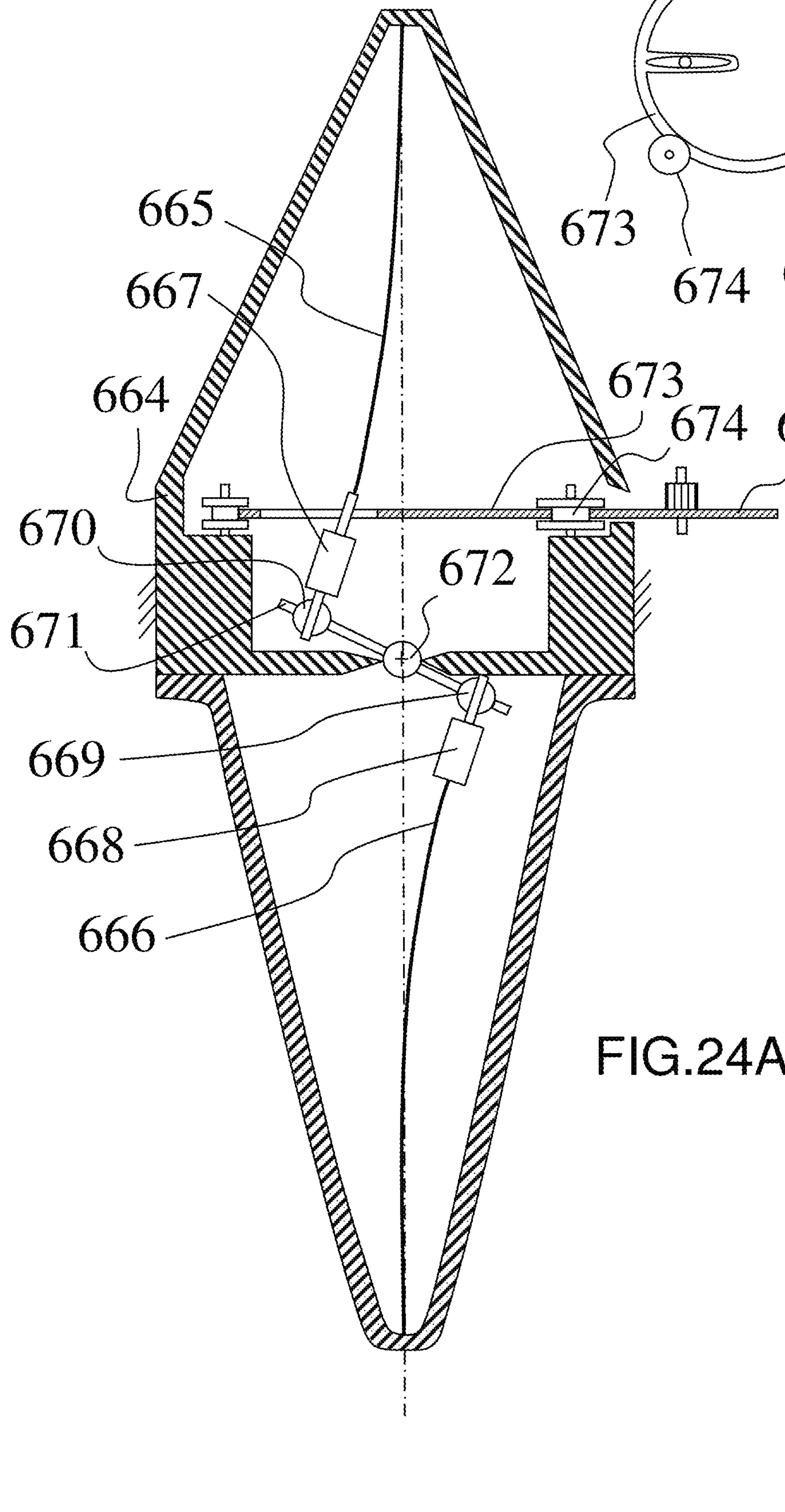

This can be achieved by making a copy of the oscillator and connecting both copies through a ball or universal joint. This is shown in FIGS. 24A and 24B a dynamically, angularly and radially balanced coupled oscillator based on two cantilevers. Two coaxial flexible rods 665 and 666 of circular cross-section each hold an orbiting mass 667 and 668 respectively at their extremity. Masses 668 and 667 are connected respectively to two spheres 669 and 670 by a sliding pivot joint (a cylindrical pin fixed to the mass slides axially and angularly into a cylindrical hole machined into the sphere). Spheres 669 and 670 are mounted into a rigid bar 671 in order to form two ball joint articulations. Bar 671 is attached to the rigid fixed frame 664 by a ball joint 672. This kinematic arrangement forces the two orbiting masses 668 and 667 to move at 180 degrees from each other and to be at the same radial distance from their neutral positions. The maintaining mechanism comprises a rotating ring 673 equipped with slot through which passes the flexible rod 665. The ring 673 is guided in rotation by three rollers 674 and driven by a gear 675 on which acts the driving torque. Its properties are

| Isotropic k | Radial k | Zero J | Isotropic m | Radial m | Gravity | Linear shock | Angular shock |
|---|---|---|---|---|---|---|---|
| Yes | Yes | Yes | Yes | Yes | Yes | Yes | Yes |

Figure 11:
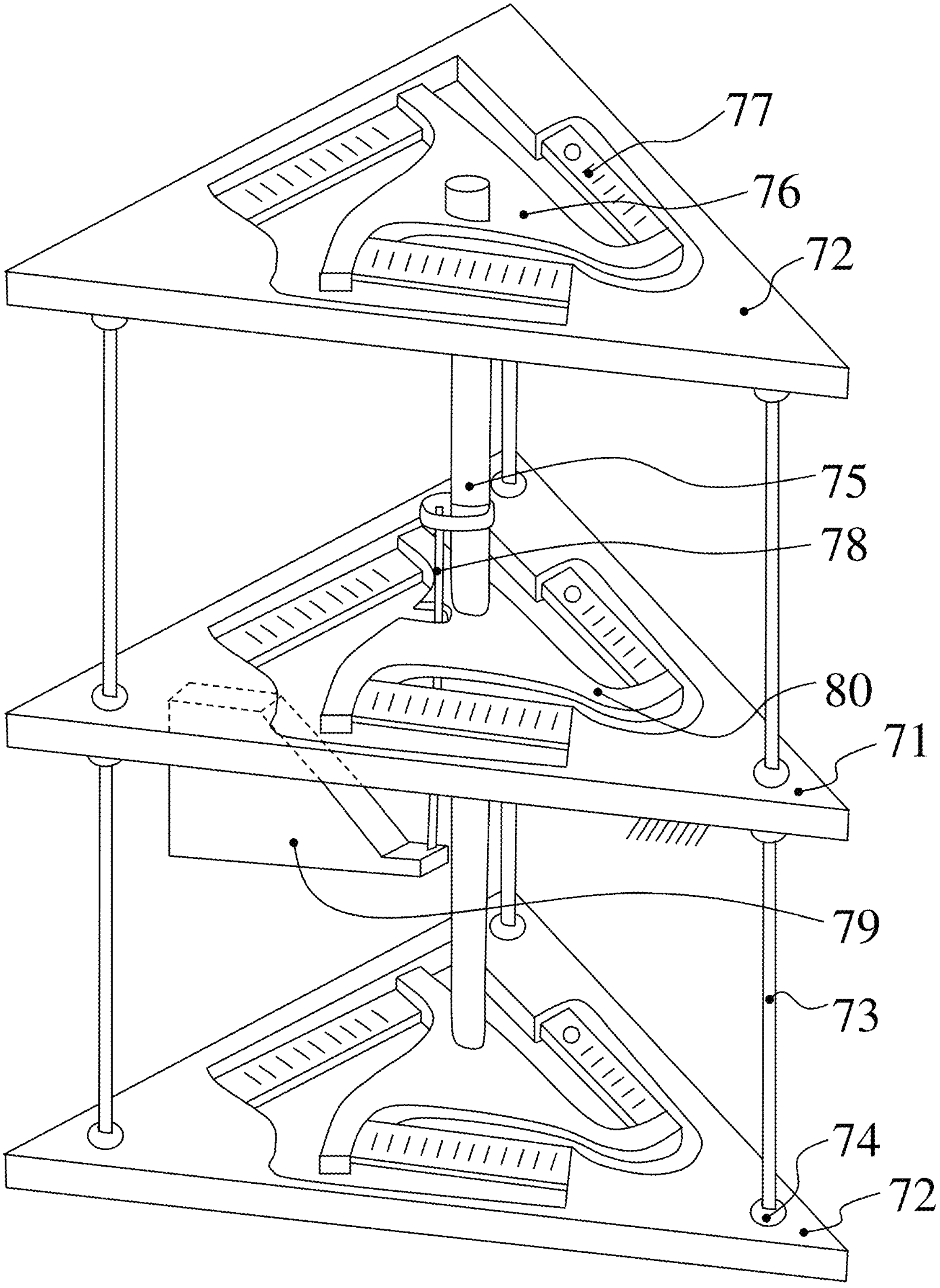
FIG. 11 illustrates a second alternate realization of gravity compensation in all directions for a general 2 degree of freedom isotropic spring. This balances the mechanism of FIG. 22.

Another method for copying and balancing oscillators is shown in FIG. 11, where two copies of the mechanism of FIG. 22 are balanced in this way. In this embodiment, fixed plate 71 holds time base comprising two linked symmetrically placed non-independent orbiting masses 72. Each orbiting mass 72 is attached to the fixed base by three parallel bars 73, these bars are either flexible rods or rigid bars with a ball joint 74 at each extremity. Lever 75 is attached to the fixed base by a membrane flexure joint (not numbered) and vertical flexible rod 78 thereby forming a universal joint. The extremities of the lever 75 are attached to the orbiting masses 72 via two flexible membranes 77. Part 79 is attached rigidly to part 71. Part 76 and 80 are attached rigidly to the lever 75. Its properties are

| Isotropic k | Radial k | Zero J | Isotropic m | Radial m | Gravity | Linear shock | Angular shock |
|---|---|---|---|---|---|---|---|
| Yes | Yes | Yes | Yes | Yes | Yes | Yes | Yes |

5.2 Dynamical Balancing for Linear Acceleration

Linear shocks are a form of linear acceleration, so include gravity as a special case. Thus, the mechanism of FIG. 20 also compensates for linear shocks.

5.3 Dynamical Balancing for Angular Acceleration

Effects due to angular accelerations can be minimized by reducing the distance between the centers of gravity of the two masses. This only takes into account angular accelerations will all possible axes of rotation, except those on the axis of rotation of our oscillators.

This is achieved in the mechanism of FIGS. 24A and 24B which is described above. Its properties are

| Isotropic k | Radial k | Zero J | Isotropic m | Radial m | Gravity | Linear shock | Angular shock |
|---|---|---|---|---|---|---|---|
| Yes | Yes | Yes | Yes | Yes | Yes | Yes | Yes |

FIG. 11 described above also balances for angular acceleration due to the small distance of the moving masses 72 from the center of mass near 78. Its properties are

| Isotropic k | Radial k | Zero J | Isotropic m | Radial m | Gravity | Linear shock | Angular shock |
|---|---|---|---|---|---|---|---|
| Yes | Yes | Yes | Yes | Yes | Yes | Yes | Yes |

6 Maintaining and Counting

Figure 10:
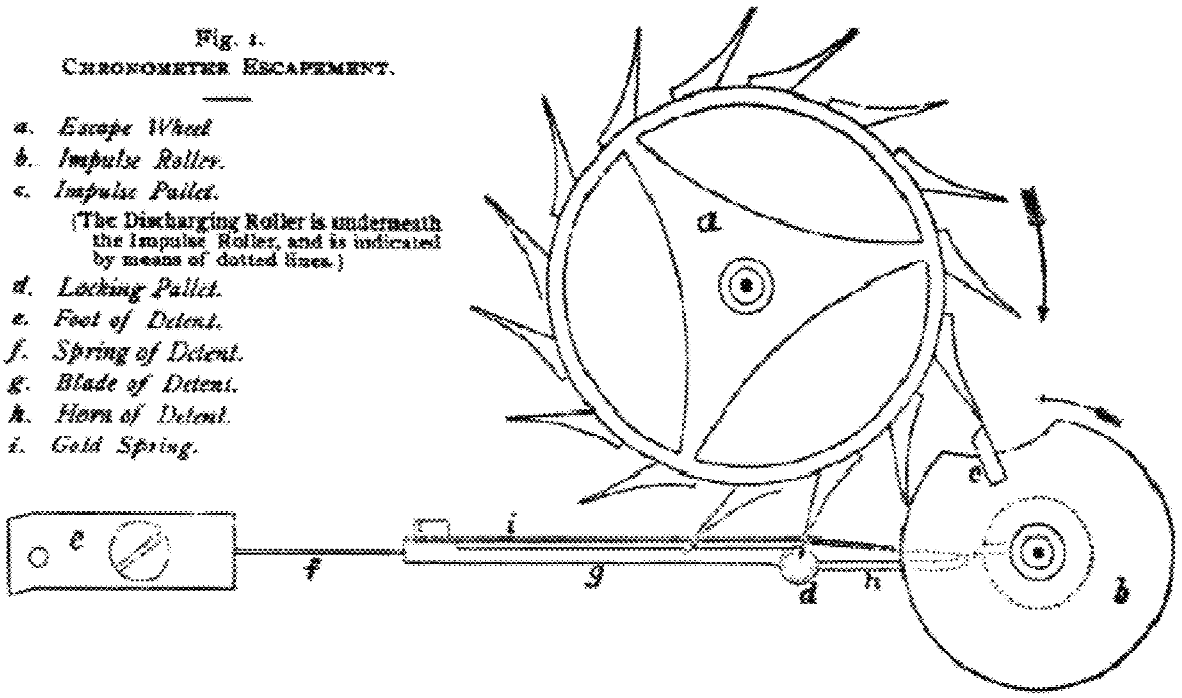
FIG.10 PRIOR ART
FIG. 10 illustrates a classical detent escapement.

Oscillators lose energy due to friction, so there needs a method to maintain oscillator energy. There must also be a method for counting oscillations in order to display the time kept by the oscillator. In mechanical clocks and watches, this has been achieved by the escapement which is the interface between the oscillator and the rest of the timekeeper. The principle of an escapement is illustrated in FIG. 10 and such devices are well known in the watch industry.

In the case of the present invention, two main methods are proposed to achieve this: without an escapement and with a simplified escapement.

6.1 Mechanisms without Escapement

Figure 8:
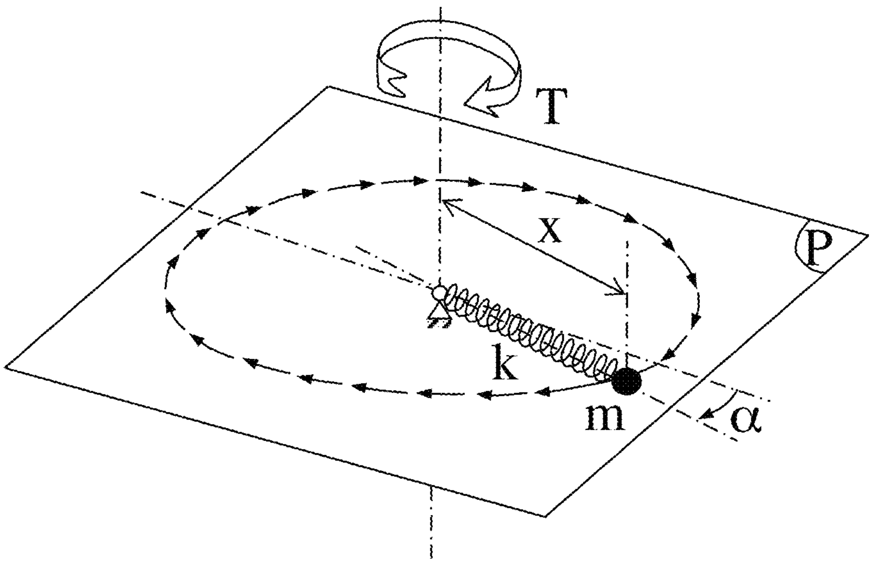
FIG.8 PRIOR ART
FIG. 8 illustrates the torque applied continuously to maintain oscillator energy.
Figure 9:
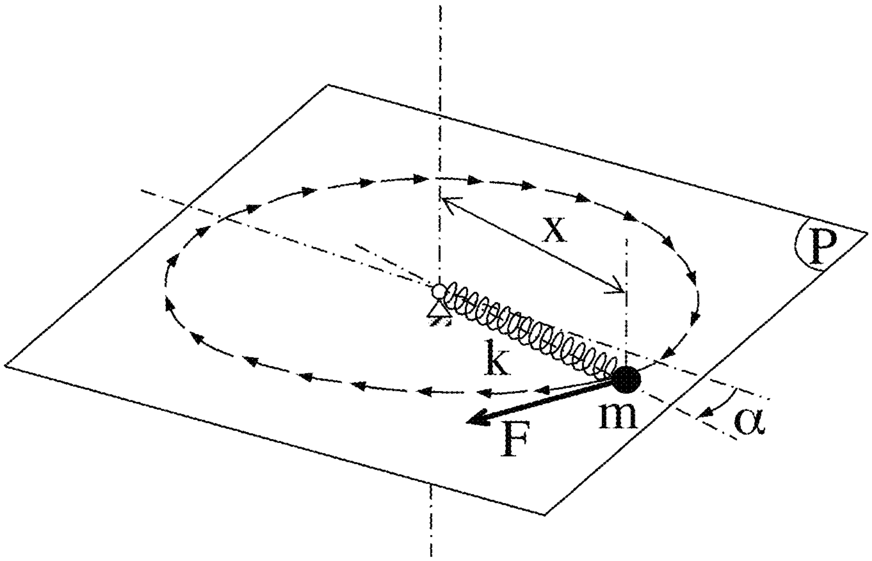
FIG.9 PRIOR ART
FIG. 9 illustrates a force applied intermittently to maintain oscillator energy.
Figure 18:
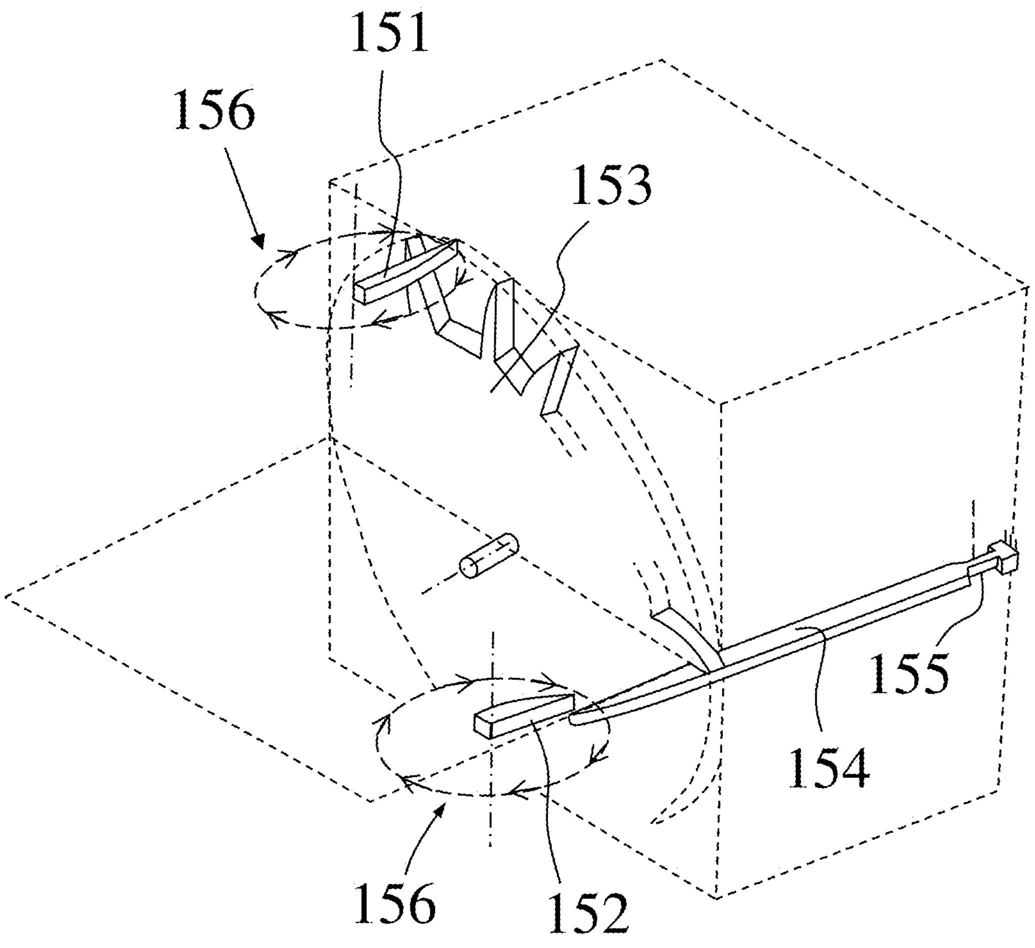
FIG. 18 illustrates an embodiment of a detent escapement for translational orbiting mass.
Figure 19:
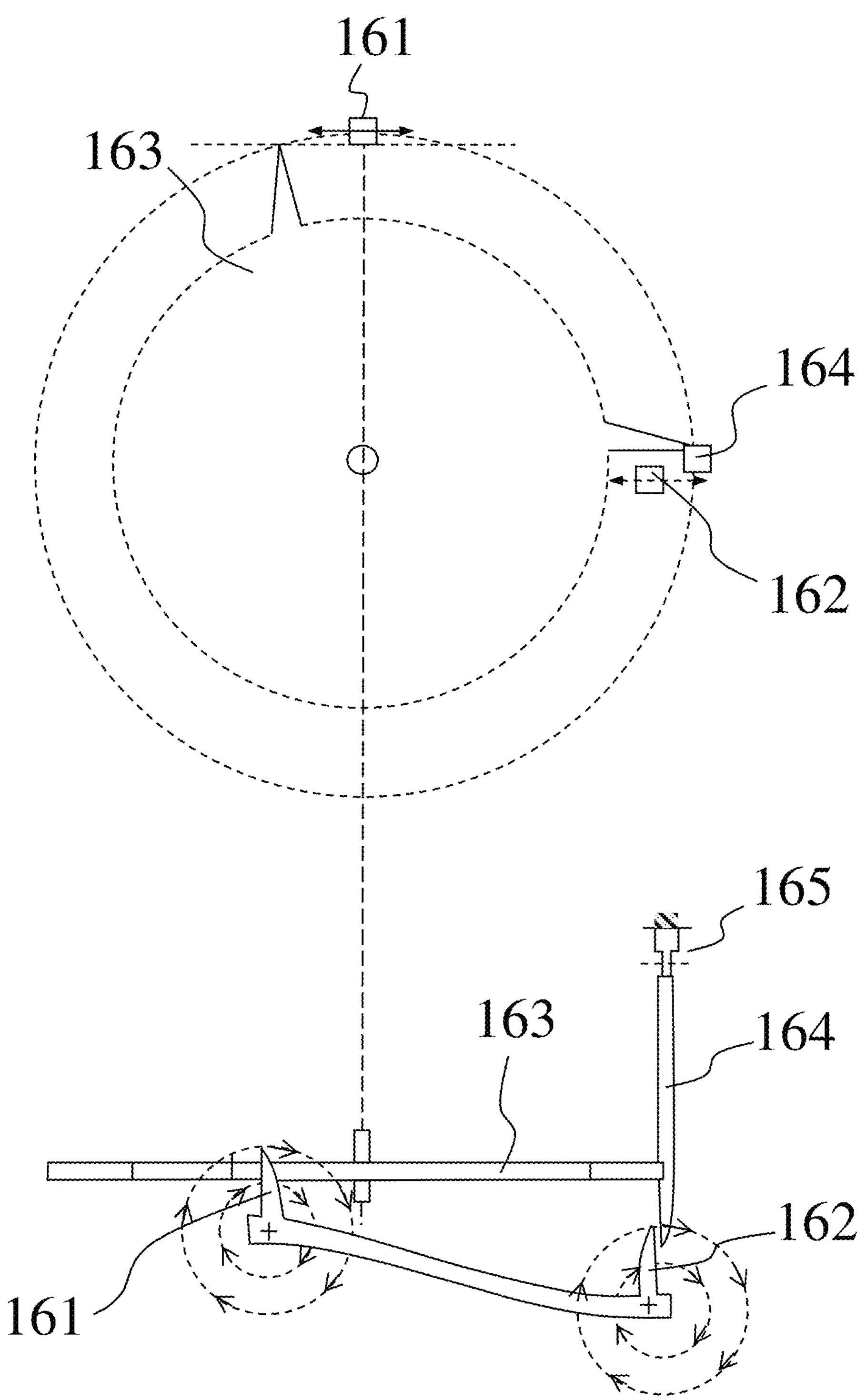
FIG. 19 illustrates another embodiment of a detent escapement for translational orbiting mass.

In order to maintain energy to the isotropic harmonic oscillator, a torque or a force are applied, see FIG. 8 for the general principle of a torque T applied continuously to maintain the oscillator energy, and FIG. 9 illustrates another principle where a force FT is applied intermittently to maintain the oscillator energy. In practice, in the present case, a mechanism is also required to transfer the suitable torque to the oscillator to maintain the energy, and in FIGS. 12 to 16 various crank embodiments according to the present invention for this purpose are illustrated. FIGS. 18 and 19 illustrate escapement systems for the same purpose. All these restoring energy mechanisms may be used in combination with the all various embodiments of oscillators and oscillators systems (stages etc.) described herein. Typically, in the embodiment of the present invention where the oscillator is used as a time base for a timekeeper, specifically a watch, the torque/force may by applied by the spring of the watch which is used in combination with an escapement as is known in the field of watches. In this embodiment, the known escapement may therefore be replaced by the oscillator of the present invention.

Figure 12:
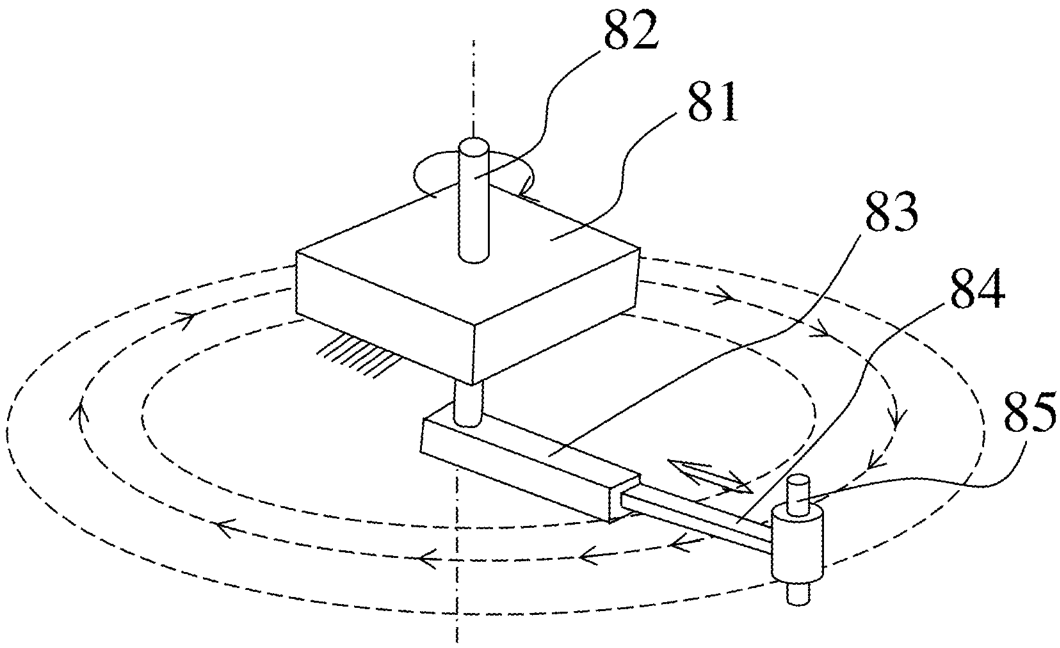
FIG. 12 illustrates a variable radius crank for maintaining oscillator energy.

FIG. 12 illustrates the principle of a variable radius crank for maintaining oscillator energy. Crank 83 rotates about fixed frame 81 through pivot 82. Prismatic joint 84 allows crank extremity to rotate with variable radius. Orbiting mass of time base (not shown) is attached to the crank extremity 84 by pivot 85. Thus the orientation of orbiting mass is left unchanged by crank mechanism and the oscillation energy is maintained by crank 83.

Figure 13B:
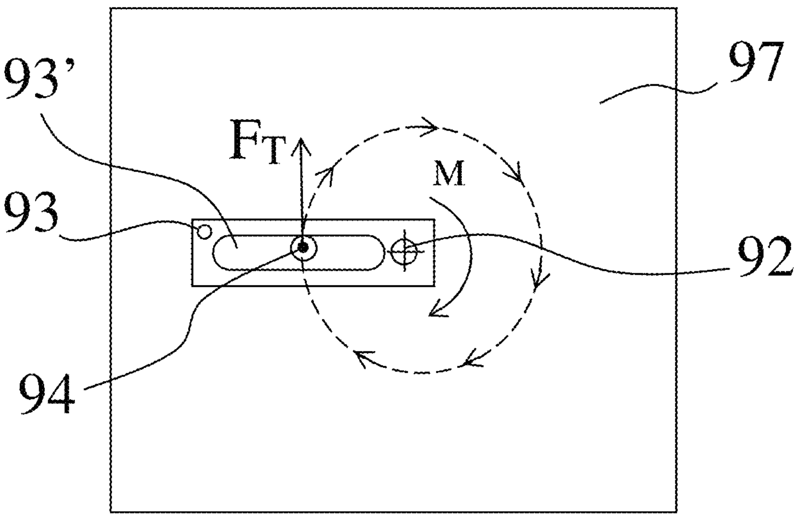
FIGS. 13A and 13B illustrates a realization of variable radius crank for maintaining oscillator energy attached to oscillator.
Figure 13A:
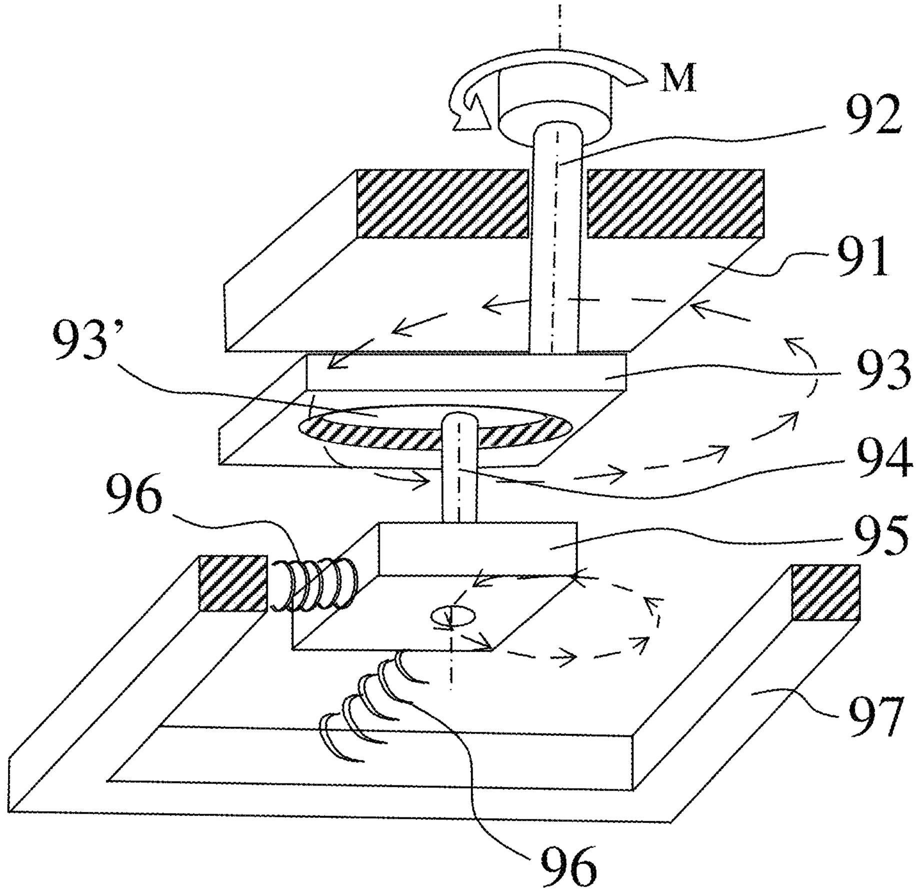

FIGS. 13A and 13B illustrate a realization of variable radius crank for maintaining oscillator energy attached to the oscillator. A fixed frame 91 holds a crankshaft 92 on which maintaining torque M is applied. Crank 93 is attached to crankshaft 92 and equipped with a prismatic slot 93'. Rigid pin 94 is fixed to the orbiting mass 95 and engages in the slot 93'. The planar isotropic springs are represented by 96. Top view and perspective exploded views are shown in this FIGS. 13A and 13B.

Figure 14:
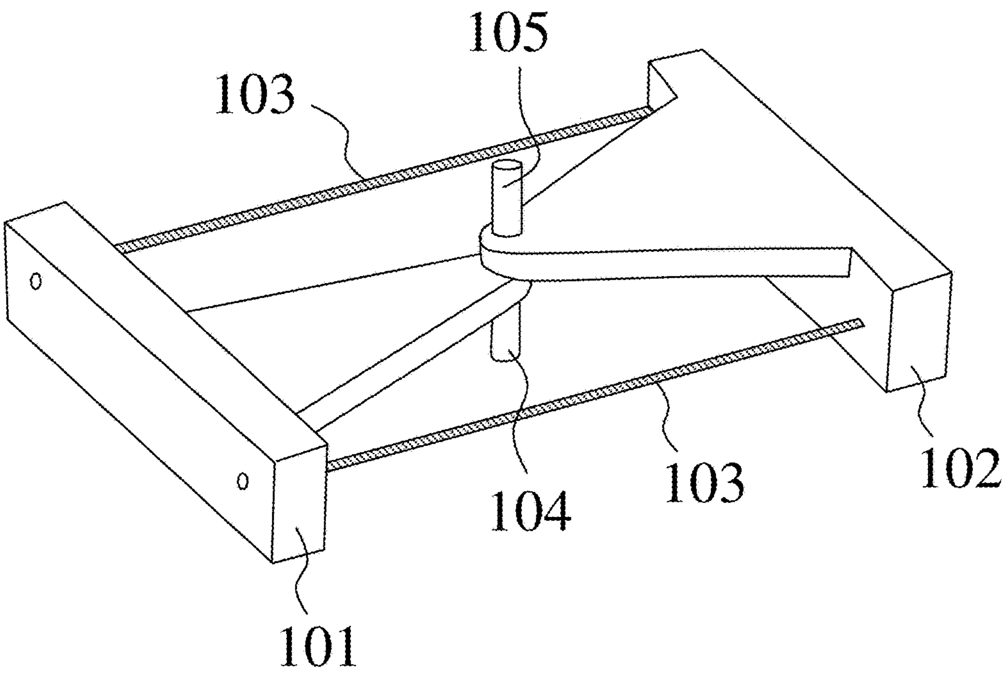
FIG. 14 illustrates a flexure based realization of variable radius crank for maintaining oscillator energy.

FIG. 14 illustrates a flexure based realization of a variable radius crank for maintaining oscillator energy. Crank 102 rotates about fixed frame (not shown) through shaft 105. Two parallel flexible rods 103 link crank 102 to crank extremity 101. Pivot 104 attaches the mechanism shown in FIG. 27 to an orbiting mass. The mechanism is shown in neutral singular position in this FIG. 27.

Figure 15:
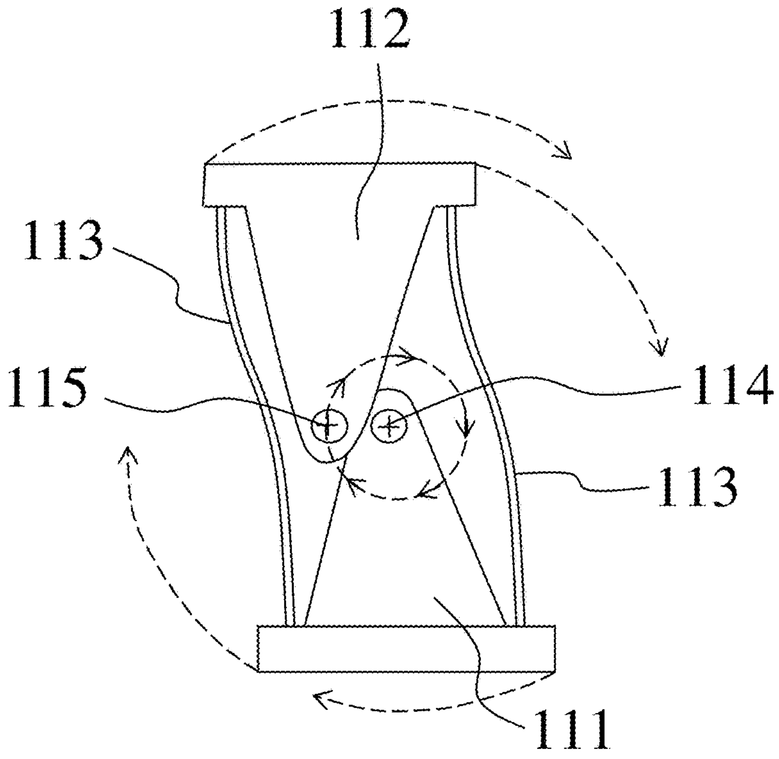
FIG. 15 illustrates a flexure based realization of variable radius crank for maintaining oscillator energy.

FIG. 15 illustrates another embodiment of a flexure based realization of variable radius crank for maintaining oscillator energy. Crank 112 rotates about fixed frame (not shown) through shaft 115. Two parallel flexible rods 113 link crank 112 to crank extremity 111. Pivot 114 attaches mechanism shown to orbiting mass. Mechanism is shown in flexed position in this FIG. 28.

Figure 16:
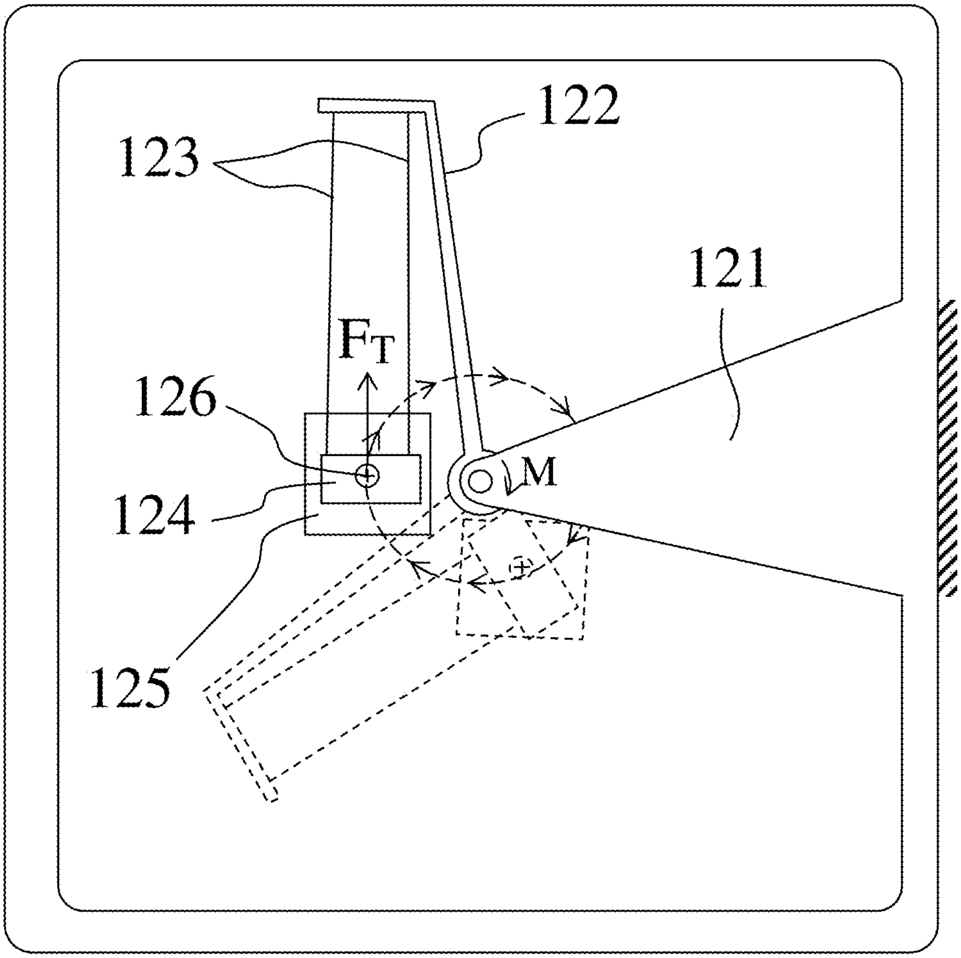
FIG. 16 illustrates an alternate flexure based realization of variable radius crank for maintaining oscillator energy.

FIG. 16 illustrates an alternate flexure based realization of variable radius crank for maintaining oscillator energy. Crank 122 rotates about fixed frame 121 through shaft. Two parallel flexible rods 123 link crank 122 to crank extremity 124. Pivot 126 attaches mechanism to orbiting mass 125. In this arrangement the flexible rods 123 are minimally flexed for average orbit radius.

6.2 Simplified Escapements

The advantage of using an escapement is that the oscillator will not be continuously in contact with the energy source (via the gear train) which can be a source of chronometric error. The escapements will therefore be free escapements in which the oscillator is left to vibrate without disturbance from the escapement for a significant portion of its oscillation.

The escapements are simplified compared to balance wheel escapements since the oscillator is turning in a single direction. Since a balance wheel has a back and forth motion, watch escapements generally require a lever in order to impulse in one of the two directions.

The first watch escapement which directly applies to our oscillator is the chronometer or detent escapement [6, 224-233]. This escapement can be applied in either spring detent or pivoted detent form without any modification other than eliminating passing spring whose function occurs during the opposite rotation of the ordinary watch balance wheel, see [6, FIG. 471c]. For example, in FIG. 10 illustrating the classical detent escapement, the entire mechanism is retained except for Gold Spring i whose function is no longer required.

H. Bouasse describes a detent escapement for the conical pendulum [3, 247-248] with similarities to the one presented here. However, Bouasse considers that it is a mistake to apply intermittent impulse to the conical pendulum. This could be related to his assumption that the conical pendulum should always operate at constant speed, as explained above.

6.3 Improvement of the Detent Escapement for the Isotropic Oscillator

Figure 17:
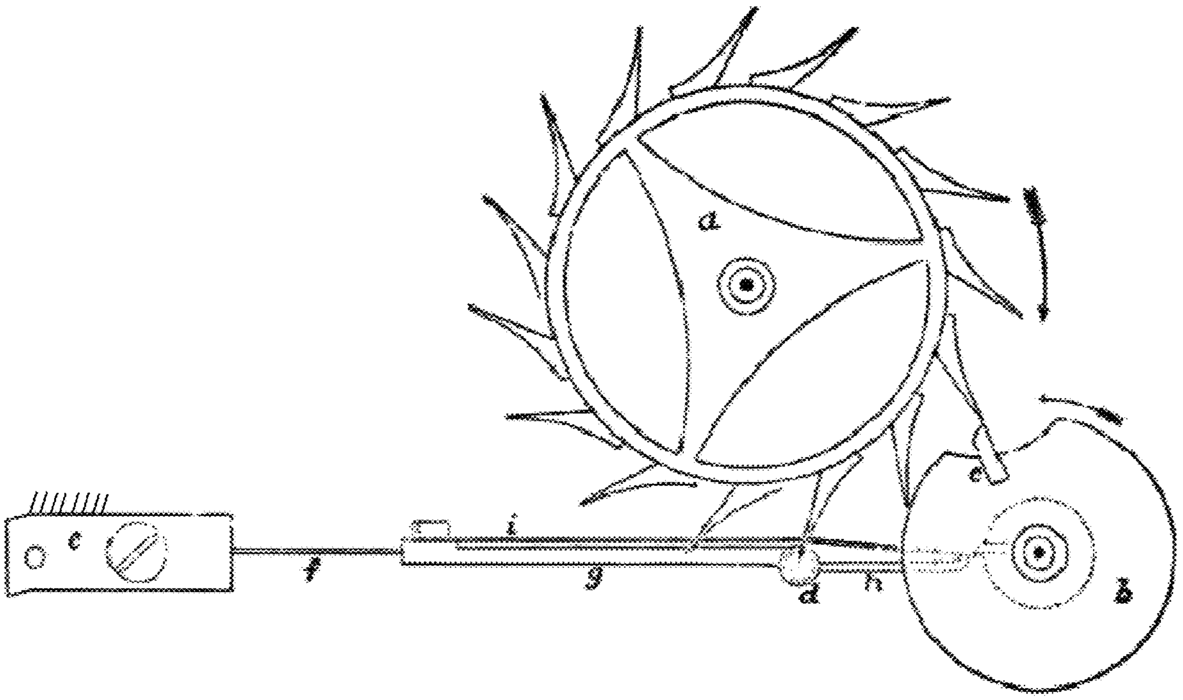
FIG.17 PRIOR ART
FIG. 17 illustrates a simplified classical detent watch escapement for isotropic harmonic oscillator.

Embodiments of possible detent escapements for the isotropic harmonic oscillator are shown in FIGS. 17 to 19.

FIG. 17 illustrates a simplified classical detent watch escapement for isotropic harmonic oscillator. The usual horn detent for reverse motion has been suppressed due to the unidirectional rotation of the oscillator.

FIG. 18 illustrates an embodiment of a detent escapement for translational orbiting mass. Two parallel catches 151 and 152 are fixed to the orbiting mass (not shown but illustrated schematically by the arrows forming a circle, reference 156) so have trajectories that are synchronous translations of each other. Catch 152 displaces detent 154 pivoted at spring 155 which releases escape wheel 153. Escape wheel impulses on catch 151, restoring lost energy to the oscillator.

FIG. 19 illustrates an embodiment of a new detent escapement for translational orbiting mass. Two parallel catches 161 and 162 are fixed to the orbiting mass (not shown) so have trajectories that are synchronous translations of each other. Catch 162 displaces detent 164 pivoted at spring 165 which releases escape wheel 163. Escape wheel impulses on catch 161, restoring lost energy to the oscillator. Mechanism allows for variation of orbit radius. Side and top views shown in this FIG. 38.

7 Difference with Previous Mechanisms 7.1 Difference with the Conical Pendulum

The conical pendulum is a pendulum rotating around a vertical axis, that is, perpendicular to the force of gravity, see FIG. 4. The theory of the conical pendulum was first described by Christiaan Huygens see references [16] and [7] who showed that, as with the ordinary pendulum, the conical pendulum is not isochronous but that, in theory, by using a flexible string and paraboloid structure, can be made isochronous.

However, as with cycloidal cheeks for the ordinary pendulum, Huygens' modification is based on a flexible pendulum and in practice does not improve timekeeping. The conical pendulum has never been used as a timebase for a precision clock.

Despite its potential for accurate timekeeping, the conical pendulum has been consistently described as a method for obtaining uniform motion in order to measure small time intervals accurately, for example, by Defossez in his description of the conical pendulum see reference [8, p. 534].

Theoretical analysis of the conical pendulum has been given by Haag see reference [11] [12, p. 199-201] with the conclusion that its potential as a timebase is intrinsically worse than the circular pendulum due to its inherent lack of isochronism.

The conical pendulum has been used in precision clocks, but never as a time base. In particular, in the 1860's, William Bond constructed a precision clock having a conical pendulum, but this was part of the escapement, the timebase being a circular pendulum see references [10] and [25, p. 139-143].

Our invention is therefore a superior to the conical pendulum as choice of time base because our oscillator has inherent isochronism. Moreover, our invention can be used in a watch or other portable timekeeper, as it is based on a spring, whereas this is impossible for the conical pendulum which depends on the timekeeper having constant orientation with respect to gravity.

7.2 Difference with Governors

Governors are mechanisms which maintain a constant speed, the simplest example being the Watt governor for the steam engine. In the 19th Century, these governors were used in applications where smooth operation, that is, without the stop and go intermittent motion of a clock mechanism based on an oscillator with escapement, was more important than high precision. In particular, such mechanisms were required for telescopes in order to follow the motion of the celestial sphere and track the motion of stars over relatively short intervals of time. High chronometric precision was not required in these cases due to the short time interval of use.

An example of such a mechanism was built by Antoine Breguet, see reference [4], to regulate the Paris Observatory telescope and the theory was described by Yvon Villarceau, see reference [24], it is based on a Watt governor and is also intended to maintain a relatively constant speed, so despite being called a regulateur isochrone (isochronous governor), it cannot be a true isochronous oscillator as described above. According to Breguet, the precision was between 30 seconds/day and 60 seconds/day, see reference [4].

Due to the intrinsic properties of harmonic oscillators following from the wave equation, see Section 8, constant speed mechanisms are not true oscillators and all such mechanisms have intrinsically limited chronometric precision.

Governors have been used in precision clocks, but never as the time base. In particular, in 1869 William Thomson, Lord Kelvin, designed and built an astronomical clock whose escapement mechanism was based on a governor, though the time base was a pendulum, see references [23] [21, p. 133-136] [25, p. 144-149]. Indeed, the title of his communication regarding the clock states that it features "uniform motion", see reference [23], so is clearly distinct in its purpose from the present invention.

7.3 Difference with Other Continuous Motion Timekeepers

There have been at least two continuous motion wristwatches in which the mechanism does not have intermittent stop & go motion so does not suffer from needless repeated accelerations. The two examples are the so-called Salto watch by Asulab, see reference [2], and Spring Drive by Seiko, see reference [22]. While both these mechanism attain a high level of chronometric precision, they are completely different from the present invention as they do not use an isotropic oscillator as a time base and instead rely on the oscillations of a quartz tuning fork. Moreover, this tuning fork requires piezoelectricity to maintain and count oscillations and an integrated circuit to control maintenance and counting. The continuous motion of the movement is only possible due to electromagnetic braking which is once again controlled by the integrated circuit which also requires a buffer of up to +12 seconds in its memory in order to correct chronometric errors due to shock.

Our invention uses an isotropic oscillator as time base and does not require electricity or electronics in order to operate correctly. The continuous motion of the movement is regulated by the isotropic oscillator itself and not by an integrated circuit.

8 Realization of an Isotropic Harmonic Oscillator

In some embodiments some already discussed above and detailed hereunder, the present invention was conceived as a realization of the isotropic harmonic oscillator for use as a time base. Indeed, in order to realize the isotropic harmonic oscillator as a time base, there requires a physical construction of the central restoring force. One first notes that the theory of a mass moving with respect to a central restoring force is such that the resulting motion lies in a plane. It follows that for practical reasons, that the physical construction should realize planar isotropy. Therefore, the constructions described here will mostly be of planar isotropy, but not limited to this, and there will also be an example of 3-dimensional isotropy. Planar isotropy can be realized in two ways: rotational isotropic springs and translational isotropic springs.

Rotational isotropic springs have one degree of freedom and rotate with the support holding both the spring and the mass. This architecture leads naturally to isotropy. While the mass follows the orbit, it rotates about itself at the same angular velocity as the support Translational isotropic springs have two translational degrees of freedom in which the mass does not rotate but translates along an elliptical orbit around the neutral point. This does away with spurious moment of inertia and removes the theoretical obstacle to isochronism.

Rotational isotropic springs will not be considered here, and the term “isotropic spring” refers only to translational isotropic springs.

17 Application to Accelerometers, Chronographs and Governors

By adding a radial display to isotropic spring embodiments described herein, the invention can constitute an entirely mechanical two degree-of-freedom accelerometer, for example, suitable for measuring lateral g forces in a passenger automobile.

In an another application, the oscillators and systems described in the present application may be used as a time base for a chronograph measuring fractions of seconds requiring only an extended speed multiplicative gear train, for example to obtain 100 Hz frequency so as to measure $1/100^{th}$ of a second. Of course, other time interval measurement is possible and the gear train final ratio may be adapted in consequence.

In a further application, the oscillator described herein may be used as a speed governor where only constant average speed over small intervals is required, for example, to regulate striking or musical clocks and watches, as well as music boxes. The use of a harmonic oscillator, as opposed to a frictional governor, means that friction is minimized and quality factor optimized thus minimizing unwanted noise, decreasing energy consumption and therefore energy storage, and in a striking or musical watch application, thereby improving musical or striking rhythm stability.

The flexible elements of the mechanisms are preferably made out of elastic material such as steel, titanium alloys, aluminum alloys, bronze alloys, silicon (monocrystalline or polycrystalline), silicon-carbide, polymers or composites. The massive parts of the mechanisms are preferably made out of high density materials such as steel, copper, gold, tungsten or platinum. Other equivalent materials are of course possible as well as mix of said materials for the realization of the elements of the present invention.

The embodiments given herein are for illustrative purposes and should not be construed in a limiting manner. Many variants are possible within the scope of the present invention, for example by using equivalent means. Also, different embodiments described herein may be combined as desired, according to circumstances.

Further, other applications for the oscillator may be envisaged within the scope and spirit of the present invention and it is not limited to the several ones described herein.

Main Features and Advantages of Some Embodiments of the Present Invention

A.1. A mechanical realization of the isotropic harmonic oscillator.

A.2. Utilization of isotropic springs which are the physical realization of a planar central linear restoring force (Hooke’s Law).

A.3. A precise timekeeper due to a harmonic oscillator as timebase.

A.4. A timekeeper without escapement with resulting higher efficiency reduced mechanical complexity.

A.5. A continuous motion mechanical timekeeper with resulting efficiency gain due to elimination of intermittent stop & go motion of the running train and associated wasteful shocks and damping effects as well as repeated accelerations of the running train and escapement mechanisms.

A.6. Compensation for gravity.

A.7. Dynamic balancing of linear shocks.

A.8. Dynamic balancing of angular shocks.

A.9. Improving chronometric precision by using a free escapement, that is, which liberates the oscillator from all mechanical disturbance for a portion of its oscillation.

A.10. A new family of escapements which are simplified compared to balance wheel escapements since oscillator rotation does not change direction.

A.11. Improvement on the classical detent escapement for the isotropic oscillator.

Innovation of Some Embodiments

B.1. The first application of the isotropic harmonic oscillator as timebase in a timekeeper.

B.2. Elimination of the escapement from a timekeeper with harmonic oscillator timebase.

B.3. New mechanism compensating for gravity.

B.4. New mechanisms for dynamic balancing for linear and angular shocks.

B.5. New simplified escapements.

Summary, Isotropic Harmonic Oscillators According to the Present Invention (Isotropic Spring)

Exemplary Features

1. Isotropic harmonic oscillator minimizing spring stiffness isotropy defect.
2. Isotropic harmonic oscillator minimizing reduced mass isotropy defect.
3. Isotropic harmonic oscillator minimizing spring stiffness and reduced mass isotropy defect.
4. Isotropic oscillator minimizing spring stiffness, reduced mass isotropy defect and insensitive to linear acceleration in all directions, in particular, insensitive to the force of gravity for all orientations of the mechanism.
5. Isotropic harmonic oscillator insensitive to angular accelerations.
6. Isotropic harmonic oscillator combining all the above properties: Minimizes spring stiffness and reduced mass isotropy and insensitive to linear and angular accelerations.

Applications of Invention

A.1. The invention is the physical realization of a central linear restoring force (Hooke’s Law).

A.2. Invention provides a physical realization of the isotropic harmonic oscillator as a timebase for a timekeeper.

A.3. Invention minimizes deviation from planar isotropy.

A.4. Invention free oscillations are a close approximation to closed elliptical orbits with spring’s neutral point as center of ellipse.

A.5. Invention free oscillations have a high degree of isochronism: period of oscillation is highly independent of total energy (amplitude).

A.5. Invention is easily mated to a mechanism transmitting external energy used to maintain oscillation total energy relatively constant over long periods of time.

A.6. Mechanism can be modified to provide 3-dimensional isotropy.

Features

N.1. Isotropic harmonic oscillator with high degree of spring stiffness and reduced mass isotropy and insensitive to linear and angular accelerations.

N.2. Deviation from perfect isotropy is at least one order of magnitude smaller, and usually two degrees of magnitude smaller, than previous mechanisms.

N.3. Deviation from perfect isotropy is for the first time sufficiently small that the invention can be used as part of a timebase for an accurate timekeeper.

N.4. Invention is the first realization of a harmonic oscillator not requiring an escapement with intermittent motion for supplying energy to maintain oscillations at same energy level.

REFERENCES

Joseph Bertrand, *Theoreme relatif au mouvement d'un point attire vers un centre fixe*, C. R. Acad. Sci. 77 (1873), 849-853.

Jean-Jacques Born, Rudolf Dinger, Pierre-André Farine, *Salto—Un mouvement mécanique a remontage automatique ayant la précision d'un mouvement a quartz*, Societe Suisse de Chronométrie, Actes de la Journée d'Etude 1997.

[3] H. Bouasse, *Pendule Spiral Diapason II*, Librairie Delagrave, Paris 1920.

[4] Antoine Breguet, *Régulateur isochrone de M Yvon Villarceau*, La Nature 1876 (premier semestre), 187-190.

[5] Louis-Clément Breguet, Brevet d'Invention 73414, 8 juin 1867, Ministère de l'agriculture, du Commerce et des Travaux publics (France).

[6] George Daniels, *Watchmaking, Updated* 2011 *Edition*, Philip Wilson, London 2011.

[7] Leopold Defossez, *Les savants du XVIIeme siecle et la mesure du temps*, Edition du Journal Suisse d'Horlogerie, Lausanne 1946.

[8] Leopold Defossez, *Theorie Generale de l'Horlogerie, Tome Premier*, La Chambre suisse d'horlogerie, La Chaux-de-Fonds 1950.

[9] Rupert T. Gould, *The Marine Chronometer, Second Edition*, The Antique Collector's Club, Woodbrige, England, 2013.

[10] R. J. Griffiths, *William Bond astronomical regulator No.* 395, Antiquarian Horology 17 (1987), 137-144.

[11] Jules Haag, *Sur le pendule conique*, Comptes Rendus de l'Académie des Sciences, 1947, 1234-1236.

[12] Jules Haag, *Les mouvements vibratoires, Tome second*, Presses Universitaires de France, 1955.

[13] K. Josic and R. W. Hall, *Planetary Motion and the Duality of Force Laws*, SIAM Review 42 (2000), 114-125.

[14] Simon Henein, *Conception des guidages flexibles*, Presses Polytechniques et Universitaires Romandes, Lausanne 2004.

[16] Christiaan Huygens, *Horologium Oscillatorium*, Latin with English translation by Ian Bruce

[17] Derek F. Lawden, *Elliptic Functions and Applications*, Springer-Verlag, New York 2010. [18] J. C. Maxwell, *On Governors*, Bulletin of the Royal Society 100 (1868), 270-83.

[19] Isaac Newton, *The Mathematical Principles of Natural Philosophy*, Volume 1, Translated by Andrew Motte 1729, Google eBook, retrieved Jan. 10, 2014.

[20] Niaudet-Breguet, "Application du diapason 'a l'horlogerie". Séance de lundi 10 décembre 1866. Comptes Rendus de l'Académie des Sciences 63, 991-992.

[21] Derek Roberts, *Precision Pendulum Clocks*, Schiffer Publishing Ltd., Atglen, P A, 2003.

[22] *Seiko Spring Drive official website*, www.seikospring-drive.com, retrieved Jan. 10, 2014.

[23] William Thomson, *On a new astronomical clock, and a pendulum governor for uniform motion*, Proceedings of the Royal Society 17 (1869), 468-470.

[24] Yvon Villarceau, *Sur les régulateurs isochrones, dérivés du système de Watt*, Comptes Rendus de l'Académie des Sciences, 1872, 1437-1445.

[25] Philip Woodward, *My Own Right Time*, Oxford University Press 1995.

[26] Awtar, S., *Synthesis and analysis of parallel kinematic XY flexure mechanisms*. Ph.D. Thesis, Massachusetts Institute of Technology, Cambridge, 2006.

[27] M. Dinesh, G. K. Ananthasuresh, *Micro-mechanical stages with enhanced range*, International Journal of Advances in Engineering Sciences and Applied Mathematics, 2010.

[28] L. L. Howell, *Compliant Mechanisms*, Wiley, 2001.

[29] Yangmin Li, and Qingsong Xu, *Design of a New Decoupled XV Flexure Parallel Kinematic Manipulator with Actuator Isolation*, IEEE 2008

[30] Yangmin Li, Jiming Huang, and Hui Tang, *A Compliant Parallel XY Micromotion Stage With Complete Kinematic Decoupling*, IEEE, 2012

The invention claimed is:

1. A mechanical isotropic harmonic oscillator comprising:

a frame;

a mass; and a plurality of flexure rods, the plurality of flexure rods consisting of:

three co-planarly arranged flexure rods, each of the three flexure rods connecting the mass to the frame, wherein axes of longitudinal extension of the three flexure rods are oriented non-parallel with respect to each other, such that the mass is configured to perform a tilting oscillation motion about an axis that is perpendicular to a plane formed by the co-planarly arranged flexure rods, and a fourth flexure rod arranged transversally to the plane formed by the co-planarly arranged three flexure rods and attached to the mass.

2. The oscillator as claimed in claim 1, wherein an axis of extension of the fourth flexure rod is arranged to be perpendicular to the plane formed by the co-planarly arranged flexure rods, traversing a center of gravity of the mass.

3. The oscillator as defined in claim 1, wherein the mass includes a solid sphere, a spherical shell, or a dumbbell, with a center of gravity of the mass at a rotational center of the tilting oscillating motion.

4. The oscillator as defined in claim 1, further comprising:

a pin attached to the mass, the pin arranged perpendicular to the plane formed by the co-planarly arranged flexure rods, an axis defined by the pin traversing a center of gravity of the mass.

5. The oscillator as defined in claim 4, further comprising:

a crank pivotably attached with respect to the frame having a slot for engaging with the pin.

6. An oscillator comprising:

a frame;

a mass configured to oscillate;

a plurality of flexing means arranged in a first plane, the plurality of flexing means consisting of three flexing means, each one of the three flexing means connecting the mass to the frame and axes of longitudinal extension of the three flexing means oriented to be non-parallel with respect to each other to limit or block one rotational degree of freedom of the mass with respect to the frame, the three flexing means arranged such that the mass is configured to perform a tilting oscillation motion about an axis that traverses a center of gravity of the mass; and a fourth flexing means arranged transversally to the first plane and attached to the mass.

7. The oscillator as claimed in claim 6, wherein the fourth flexing means is arranged to be perpendicular to the same plane, traversing the center of gravity of the mass.

8. The oscillator as defined in claim 6, wherein the mass includes a solid sphere, a spherical shell, or a dumbbell, with the center of gravity of the mass at a rotational center of the tilting oscillating motion.

9. The oscillator as defined in claim 6, wherein the three flexing means are arranged in a same plane, the oscillator further comprising:

a pin attached to the mass arranged perpendicular to the same plane, an axis of the pin traversing the center of gravity of the mass.

10. The oscillator as defined in claim 9, further comprising:

a crank pivotably attached with respect to the frame having a slot for engaging with the pin.

11. The oscillator as claimed in claim 1, wherein the fourth flexure rod defines a length L between a first attachment point at the mass and a second attachment point at the frame, wherein the plane formed by the three co-planarly arranged flexure rods intersects at a distance L/8 with the fourth flexure rod measured from the first attachment point.

12. The oscillator as claimed in claim 1, wherein the axes of longitudinal extension of the three flexure rods are oriented at 120 degrees with respect to each other.

13. The oscillator as claimed in claim 1, wherein the three co-planarly arranged flexure rods are configured to block one rotational degree of freedom of the mass with respect to the frame around the axis that is perpendicular to a plane defined by the three co-planarly arranged flexure rods.

14. The oscillator as claimed in claim 1, wherein the mass and the three co-planarly arranged flexure rods are arranged such that a center of gravity of the mass intersects with the plane defined by defined by the three co-planarly arranged flexure rods.

15. The oscillator as claimed in claim 1, wherein one end of each one of the three flexure rods is attached to the frame, and another end of each one of the three flexure rods is attached to the mass, the three flexure rods forming a triangular arrangement.

16. The oscillator as claimed in claim 6, wherein the fourth flexing means defines a length L between a first attachment point at the mass and a second attachment point at the frame, wherein the same plane intersects at a distance L/8 with the fourth flexing means measured from the first attachment point.

17. The oscillator as claimed in claim 6, wherein the axes of longitudinal extension of the three flexing means are oriented at 120 degrees with respect to each other.

18. The oscillator as claimed in claim 6, wherein the three flexing means are arranged in a same plane, and wherein the three flexing means are configured to block one rotational degree of freedom of the mass with respect to the frame around an axis that is perpendicular to the same plane.

19. The oscillator as claimed in claim 6, wherein the three flexing means are arranged in a same plane, and wherein the mass and the three flexing means are arranged such that the center of gravity of the mass intersects with the same plane.

20. The oscillator as claimed in claim 6, wherein one end of each one of the three flexing means is attached to the frame, and another end of each one of the three flexing means is attached to the mass, the three flexing means forming a triangular arrangement.

* * * * *